(12) United States Patent
Pinnavaia et al.

(10) Patent No.: US 6,261,640 B1
(45) Date of Patent: Jul. 17, 2001

(54) METHOD FOR THE PREPARATION OF HOMOSTRUCTURED MIXED PROTON AND ORGANIC LAYERED SILICATES

(75) Inventors: Thomas J. Pinnavaia, East Lansing, MI (US); Zhen Wang, Palatine, IL (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 0 days.

(21) Appl. No.: 09/518,355

(22) Filed: Mar. 3, 2000

(51) Int. Cl.$^7$ ...................................................... B05D 1/00

(52) U.S. Cl. ............................................................ 427/384

(58) Field of Search ............................................. 427/384

(56) References Cited

U.S. PATENT DOCUMENTS

| | | |
|---|---|---|
| 3,432,370 | 3/1969 | Bash et al. . |
| 3,511,725 | 5/1970 | Stevens et al. . |
| 3,847,726 | 11/1974 | Becker et al. . |
| 4,683,259 | 7/1987 | Goodman . |
| 4,810,734 | 3/1989 | Kawasumi . |
| 4,889,885 | 12/1989 | Usuki . |
| 5,102,948 * | 4/1992 | Deguchi et al. ................. 524/789 |
| 5,552,469 | 9/1996 | Beall et al. . |
| 5,853,886 | 12/1998 | Pinnavaia et al. . |
| 5,866,645 | 2/1999 | Pinnavaia . |
| 5,993,769 | 11/1999 | Pinnavaia . |
| 6,017,632 | 1/2000 | Pinnavaia et al. . |

FOREIGN PATENT DOCUMENTS

| | | |
|---|---|---|
| 1004859 | 2/1977 | (CA) . |
| WO93/04117 | 3/1993 | (WO) . |
| WO93/04118 | 3/1993 | (WO) . |
| WO95/14733 | 6/1995 | (WO) . |
| 96/08526 | 3/1996 | (WO) . |

OTHER PUBLICATIONS

Barrer, R.M. and K. Brummer, Trans. Faraday Soc. 59:959–968 (1963).
Theng, B.K.G., et al., Clay Miner. 7:1–17 (1967).
Ijdo et al., Advanced Materials 8:79–83 (1996).
McBride, M.B., et al., Clay Miner. 10:357 (1975).
Xu, S., et al., Soil Sci. Soc. Am. J. 58:1382–1391 (1994).
Vansant, E.F., et al., Clays Clay miner 20:47–54 (1972).
McBride, M.B., et al., Clays Clay Minerals 21:323–329 (1973).
Lee,J.–F., et al., J. Chem. Soc. Faraday Trans. I, 85:2953–2962 (1989).
Kato, C., et al., Clays Clay Miner. 27:129 (1979).
Vaia, R.A., et al., Chem. Mater. 5 1694 (1993).
Messersmith,P.B., et al., Chem. Mater. 5 1064 (1993).
Fukushima, Y., et al., J. Inclusion Phenom. 5 473 (1987).
Fukushima, Y., et al., Clay Miner. 23 27 (1988).
Usuki, A., et al., J. Mater. Res. 8 1179 (1993).
Kojima, Y., et al., J. Mater. Res. 8 1185 (1993).
Lan, T. and Pinnavaia, T.J., Chem. Mater. 6 2216 (1994).
Lan. T. and T. J. Pinnavaia, Proceedings of ACS PMSE 71:527 (1994).
Akelah, et al., Clay Minerals 29:169–178 (1994).
Messersmith et al., Chem. Mater. 1719–1725 (1994).
Giannelis, E.P. JOM 4428 (1992).
Gleiter, H. Adv. Mater. 4 474 (1992).
Novak, B.M., Adv. Mater. 5 422 (1993).
Pinnavaia, T.J., Science 220 365 (1983).

\* cited by examiner

Primary Examiner—Erma Cameron
(74) Attorney, Agent, or Firm—Ian C. McLeod

(57) ABSTRACT

Homostructured, cation exchanged, layered compositions containing mixed onium and protonated hydronium ions and mixtures thereof are described. Particulate concentrates formed by intercalation of a polymer component into the galleries of the layered inorganic and organic homostructured layered cation exchange composition and to the use of the particulate concentrates for the preparation of cured polymer-inorganic nanolayer hybrid composite compositions are described. In the most preferred embodiment of the invention the layered inorganic composition is selected from the family of 2:1 layered silicate clays.

12 Claims, 9 Drawing Sheets

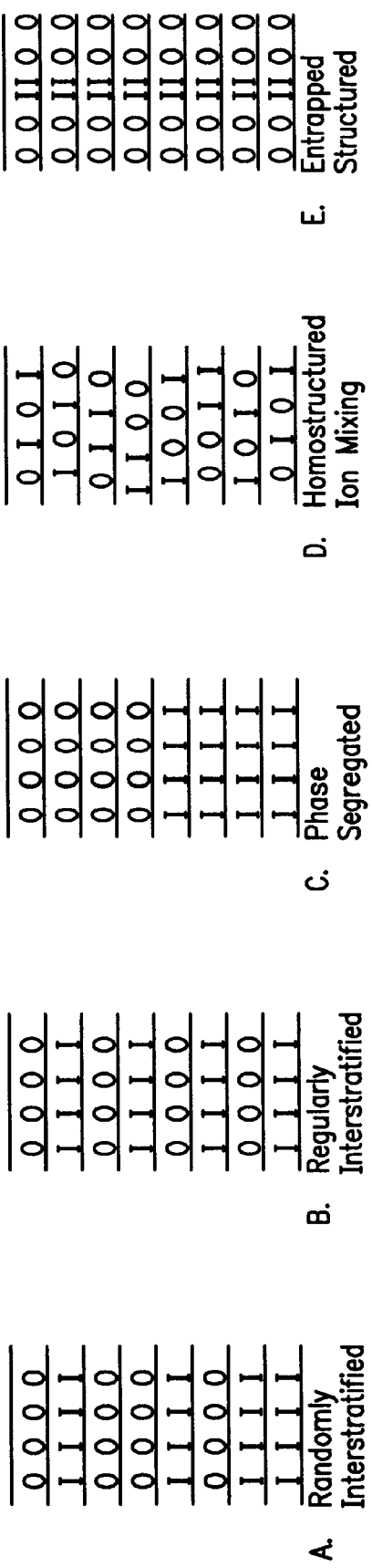

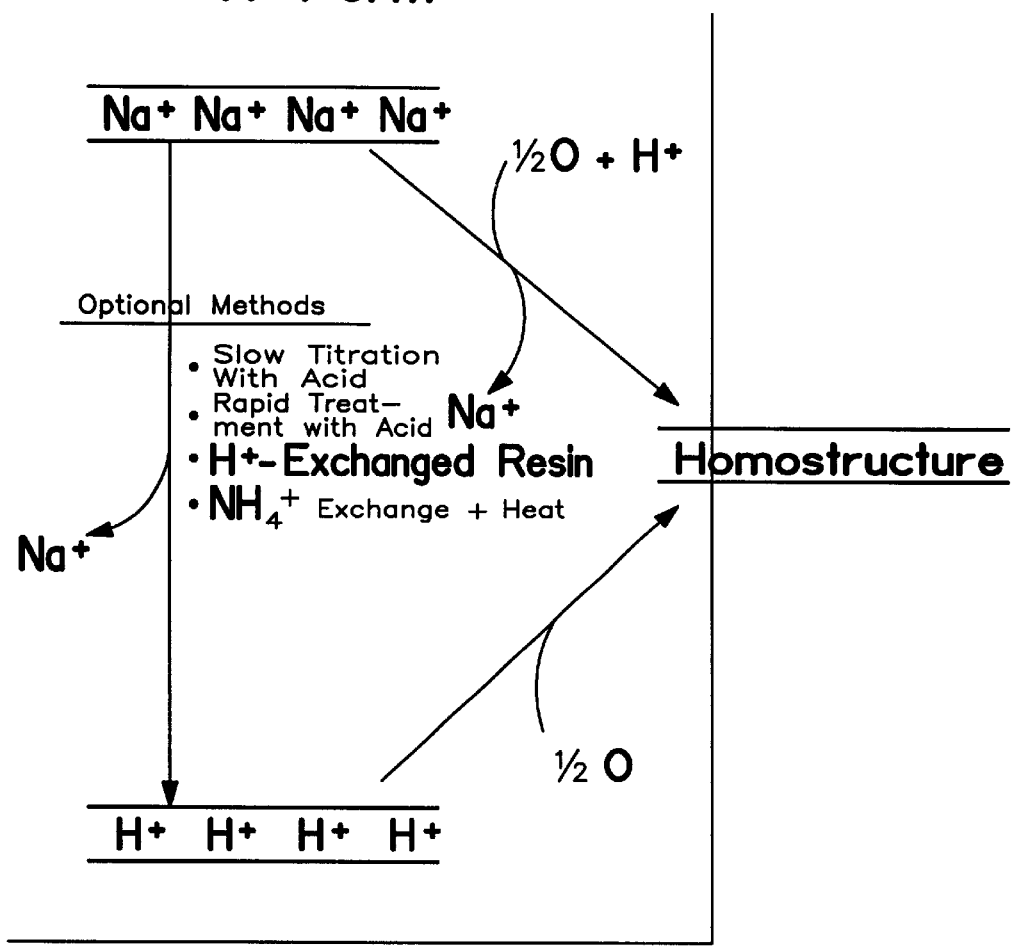
FIG. 2    O = alkylamine
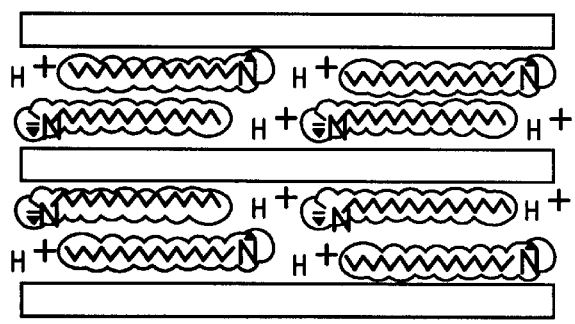
FIG. 3

METHOD FOR THE PREPARATION OF HOMOSTRUCTURED MIXED PROTON AND ORGANIC LAYERED SILICATES

CROSS-REFERENCE TO RELATED APPLICATIONS

None

BACKGROUND OF THE INVENTION (1) Field of the Invention

The present invention relates to an improved process for forming homostructured mixed organic and inorganic cation exchanged layered silicates. In particular, the present invention relates to a process which produces protons and onium ions in galleries between silicate nanolayers by intercalating an onium ion precursor, such as an amine, into the galleries.

(2) Description of Related Art

Smectite clays are natural or synthetic layered aluminosilicates such as montmorillonite, bentonite, hectorite, fluorohectorite, saponite, beidellite, nontronite, and related analogs. Smectite clays have layered lattice structures in which the tactoids (crystallites) consist of stacked two-dimensional oxyanions separated by layers of hydrated cations. The oxygen atoms define layers approximately 10 Å-thick, containing two sheets of tetrahedral sites and a central sheet of octahedral sites. The 2:1 relation between the tetrahedral and the octahedral sheets in a layer defines 2:1 layered silicates. For a typical 2:1 layered silicate, such as montmorillonite, the layer is made up of a central octahedral sheet, usually occupied by aluminum or magnesium, sandwiched between two sheets of tetrahedral silicon sites. Various isomorphous cation substitutions, e.g., $Si^{4+}$ by $Al^{3+}$ in the tetrahedral sheet, or $Al^{3+}$ by $Mg^{2+}$, or $mg^{2+}$ by $Li^+$ in the octahedral sheet, among others, also result in negatively charged nanolayers. These negatively charged layers are separated by hydrated cations such as alkali or alkaline earth metal ions in the gallery (interlayer) regions between the 2:1 layered silicates. The negative charge on the layer is balanced by interlayer of "gallery" cations, normally $Ca^{2+}$ and $Na^+$. The gallery cations in a natural smectite can be replaced by simple ion exchange process with almost any desired cation, including alkylammonium, alkyl phosphonium and other organic cations. Some idealized unit cell compositions and layer charge densities of smectite clays are listed in Table 1.

TABLE 1

Ideal Structural Formulas for some 2:1 Layered Silicates

| Mineral Name | Ideal Formula | Layer Charge Density per $O_{20}$ unit |
|---|---|---|
| Hectorite | $M_{x/n}{}^{n+} \cdot yH_2O[Al_{6.0-x}Mg_x](Si_{8.0})O_{20}(OH)_4$ | 0.4–1.2 |
| Fluorohectorite | $M_{x/n}{}^{n+} \cdot yH_2O[Al_{6.0-x}Mg_x](Si_{8.0})O_{20}(OH,F)_4$ | 0.4–1.2 |
| Montmorillonite | $M_{x/n}{}^{n+} \cdot yH_2O[Mg_{6.0-x}Li_x](Si_{8.0})O_{20}(OH)_4$ | 0.6–1.0 |
| Nontronite | $M_{x/n}{}^{n+} \cdot yH_2O[Fe_{4.0}](Si_{8.0-x}Al_x)O_{20}(OH)_4$ | 0.6–1.0 |
| Beidellite | $M_{x/n}{}^{n+} \cdot yH_2O[Al_{4.0}](Si_{8.0-x}Al_x)O_{20}(OH)_4$ | 0.8–1.0 |
| Saponite | $M_{x/n}{}^{n+} \cdot yH_2O[Mg_{4.0}](Si_{8.0-x}Al_x)O_{20}(OH)_4$ | 0.6–1.2 |

TABLE 1-continued

Ideal Structural Formulas for some 2:1 Layered Silicates

| Mineral Name | Ideal Formula | Layer Charge Density per $O_{20}$ unit |
|---|---|---|
| Vermiculite | $Mg_{(x-z)}y^{2+}[Mg_{6-x}Fe_z{}^{III}](Si_{8-x}Al_x)O_{20}(OH)_4$ | 1.1–1.4 |
| Muscovite mica | $K_2[Al_{4.0}](Si_{6.0}Al_{2.0})O_{20}(OH)_4$ | 2.0 |
| Biotite mica | $K_2[Al_yMg^{6+}{}_{(x/2)-(3y-2)}](Si_{6.0-x}Al_{2.0+x})O_{20}(OH)_4 (x < 1, y \geq 2)$ | 2.0 |
| Phlogopite mica | $K_2[Mg_{6.0}](Si_{6.0}Al_{2.0})O_{20}(OH)_4$ | 2.0 |

Included in Table 1 for comparison purpose are the idealized compositions of 2:1 layered silicates, smectite clays, vermiculite, muscovite mica, biotite mica, and phlogopite mica. Vermiculite has a layer charge density higher than a smectite but lower than a mica. Micas usually have layer charge of 2.0. The gallery cations in a vermiculite or a mica can also be replaced by ion exchange, but the exchange processes are generally slower than for smectite clays. Also, vermiculites and micas exist commonly as single crystals that range in size from 10 $\mu$m to 10 cm or larger. In contrast, smectite clays have sub-micron particle sizes. The particle size of vermiculite and mica can be reduced to the micron size range by mechanical grinding. Other ion exchangeable 2:1 layered silicate including illite, rectorite and synthetic derivative such as tetrasilicic mica and synthetic mica montmorillonite (SMM).

Those skilled in the art will know that smectites are members of a more universal class of layered inorganic ion exchangers. Many other layered inorganic cation exchanger materials can be selected in place of smectites. These layered materials include crystalline sheet silicate, layered phosphates, arsenates, sulfates, titanates and niobates.

The crystalline sheet silicates include kenyaite: $Na_2Si_{20}O_{41} \cdot 10H_2O$; magadite: $Na_2Si_{20}O_{41} \cdot 3H_2O$; makatite; $Na_2Si_4O_9 \cdot 3H_2O$; kanemite: $NaHSi_2O_5 \cdot 3H_2O$; revdite; $Na_2Si_2O_5 \cdot 5H_2O$; Grumantite: $NaHSi_2O_5 \cdot 0.9H_2O$; and Ilerite (octosilicate): $Na_2Si_8O_{17}$.

The layered phosphates, arsenates, titanates and niobates are listed as follows:

TABLE 2

| Class | Compound general formula |
|---|---|
| Phosphates | $H_2\{M^{IV}(PO_4)_2\} \cdot XH_2O$, ($M^{IV}$ = Zr, Ti, Ge, Sn, Pb) $CaPO_4 \cdot R \cdot H_2O$ (R = $CH_3$, $C_2H_5$), $VOPO_4 \cdot 2H_2O$, $NbOPO_4 \cdot 3H_2O$, $H\{SnCl(OH)PO_4\} \cdot 2H_2O$ |
| Arsenates | $H_2\{M^{IV}(AS_4)_2\} \cdot xH_2O$, $H\{MnAsO_4\} \cdot H_2O$ (krautite), $H\{SnCl(OH)AsO_4\} \cdot 2H_2O$ |
| Titanates | $Na_2Ti_3O_7, K_2Ti_4O_9$, $Na_4Ti_9O_{20} \cdot xH_2O$, $K_2Ln_2Ti_3O_{10} \cdot H_2O$ |
| Vanadates | $KV_3O_8$ |
| Niobates | $KTiNbO_5, CSTi_2NbO_7, A_3Ti_5NbO_{14}$, (A = Li, Na, K, Rb, Cs, Ti), $KNb_3O_8, K_4Nb_6O_{17}$, $ACa_2Nb_3O_{10}$, (A = K, Rb, Cs) |
| Molybdates | $MoO_3$ (OH),$H_xMoO_3$ |
| Uranyl Compound | $H\{(UO_2PO_4\} \cdot 4H_2O, H\{UO_2AsO_4\} \cdot 4H_2O$ |
| Manganates | Busertite |

Most important among the properties of smectite clays is the ability to replace the gallery cations in the pristine clay with almost any desired cations by ion exchange reactions. The exchange cations are very important in determining the ability of the gallery regions to imbibe (intercalate) neutral molecules. Inorganic cations ($M^{n+}$) such as ($Na^+$, $Ca^{2+}$ and the like) prefer to be solvated by polar molecules such as water and certain polar organic molecules. Thus, these exchange forms are readily swollen by polar molecules, especially by water. Organic cations (alkylammonium, phosphonium ions and the like) are less hydrophilic, even hydrophobic, and prefer to intercalate organic molecules into the gallery regions. Inorganic cations such as $K^+$ and $Mg^{2+}$ in mica are anhydrous and strongly bound to the intergallery surfaces. Therefore, these silicates are difficult for gallery swelling and ion exchange reaction. However, the exchange of gallery cations in micas can be facilitated by reducing the particle size of the particles, preferably to average values of 2 $\mu$m or less.

Clay-organic intercalates are intercalation compounds in which organic molecules enter the clay galleries and form definite compositions with specific clay basal spacings. The organic compounds that have been reported to form clay intercalates include uncharged polar organic compounds and positively charged organic ions, and ion-paired organic salts. These classes of guest species are intercalated by ion exchange, physical adsorption, or other mechanisms. Intercalation of organic polymers in clay minerals has been recognized to occur as natural processes in soils. Polymer adsorption and desorption also occurs under synthetic conditions (Theng, B. K. G. "The Chemistry of Clay-Organic Reactions", John Wiley & Sons, pages 136 to 206 (1974)). Interaction between clays and polymeric species has been discussed as natural or synthetic polymer adsorption and desorption (Theng, B. K. G. "Formation and Properties of Clay-Polymer Complexes". Elsevier pages 63 to 133 (1979)).

Mixed organic/inorganic ion exchanged forms of 2:1 layered silicates can potentially adopt one of several possible structures depending on the distribution of the distinguishable cations in the interlayer galleries. Organo cations particularly alkylammonium ions such as $(CH_3)_3NH^+$ and $(CH_3)_4N^+$ among others, are known to form interstratified structures when mixed with $Na^+$ ions in the galleries of montmorillonite (Barrer, R. M. and K. Brummer, Trans. Faraday Soc. 59:959–968 (1963); and Theng, B. K. G., et al., Clay miner. 7:1–17 (1967)). In these interstratified phases the galleries are occupied by "onium-rich" and "sodium-rich" compositions of exchange cations. That is, the organic and inorganic exchange cations are "demixed" or largely segregated into separate galleries. Also, the stacking sequence of "onium-rich" and "sodium-rich" galleries is random in an interstratified mixed ion system. Interstratified onium ion/alkali metal ion smectite clays typically exhibit XRD spacings that increase with the amount of the larger onium ion occupying exchange positions in the galleries.

The segregation of organic onium ions and inorganic cations also has been recently observed for mixed ion exchange form of fluorohectorite containing equal molar amounts of a quaternary phosphonium ion, namely, $(C_{18}H_{37})P(C_4H_9)_3^+$, and an alkali metal ion, namely, $Li^+$, $Na^+$, or $K^+$ (Ijdo et al, Advanced Materials 8:79–83 (1996)). In these latter compositions the organic and inorganic ions also are segregated into separate galleries, but unlike interstratified systems the stacking sequence of inorganic and organic galleries regularly alternates. This regular sequencing of galleries gives rise to ordered heterostructures that exhibit several orders of rational 001 reflections.

Yet another common behavior of mixed organic/inorganic exchange cation clays is the segregation of the two types of ions into homoionic tactoids containing long range stacking sequences of galleries that are occupied predominantly by one or the other cation. That is, the replacement of inorganic exchange ions by organic exchange ions occurs sequentially, gallery by adjacent gallery. Thus, if a fraction of the inorganic cations in a sample is replaced by organic ions, then one is left with a mixture of tactoids consisting of two homoionic end-member ion exchanged forms. These phase segregated mixed ion clays typically exhibit XRD powder patterns characteristic of a physical mixture of the homoionic, end-member forms of the parent organic and inorganic cation exchanged clays.

Randomly interstratified, heterostructured (regularly interstratified), and phase segregated mixed organic/inorganic ion clays and related 2:1 layered silicates have limited utility for commercial applications. The distributions of inorganic cations (I) and organic cations (O) in each of these three systems is schematically illustrated in FIGS. 1A, 1B and 1C, respectively. Because the organic exchange cations in each of these structures are largely segregated from the inorganic cations in separate organic-rich galleries, only those organic-rich galleries will be hydrophobic and suitable for intercalation and swelling by organic reagents and solvents.

It is the hydrophobicity of homoionic organic cation exchanged clays that makes them useful as materials for Theological control agents (e.g. in oil well drilling fluids, cosmetic formulations, and household cleaning products), adsorbents for toxic organic chemicals from water, and as components for organic polymer-layered silicate nanocomposite formation. Consequently, only the organic cation rich galleries of interstratified, heterostructured and phase-segregated mixed ion clays will be useful. The fraction of the clay containing inorganic-cation rich galleries will not participate in the desired intercalation chemistry with organic reagents, solvents and polymers. For this reason, fully exchanged homoionic organo clays, most typically quaternary ammonium ion clays, are used for the said applications.

One way of reducing the amount of expensive organic cations needed for hydrophobic intercalation and swelling is to mix organic and inorganic cations within the same galleries. Such mixed exchange cation forms may be said to be "homostructured" because each gallery in the tactoid would be compositionally equivalent and would exhibit uniform intercalation properties. The gallery distribution of inorganic ions (I) and organic ions (O) in a homostructured mixed ion intercalate is shown schematically in FIG. 1D. Homostructured organic/inorganic ion exchanged clays could, in principle, be made hydrophilic, hydrophobic, or even amphophilic depending on the relative population of organic or inorganic ions in the gallery. By adjusting the polarity of the galleries one can favor adsorption of guest species based on their intrinsic polarity. Also amphophilic galleries would allow co-adsorption of both organic and inorganic reagents for possible intragallery reaction. Still further, it should be possible using hydrophobic derivatives to adsorb organic reagents in galleries where the inorganic cation is an element capable of catalyzing reaction of the organic reagent (e.g. a transition metal ion). Despite the anticipated advantages of homostructured mixed ion clays, these structures are rare and very limited in the range of organic ion to inorganic exchange cation ratio. It has been suggested on thermodynamic grounds by Vansant and Uytterhoeven that homogeneous mixing of two exchange cations in every gallery should be possible. But such systems are very difficult to realize in practice. For instance, McBride and Mortland (McBride, M. B., et al., Clay Miner. 10:357 (1975)) observed random interstratification of ions in the replacement of $Cu^{2+}$ ions by tetramethyl ammonium ions in montmorillonite. Also, Xu and Boyd (Xu, S., et al., Environ. Sci. Technol. 29:312–320 (1995); and Xu, S., et al., Soil Sci. Soc. Am. J. 58:1382–1391 (1994)) observed the segregation of $(C_{16}H_{33})N(CH_3)_3$ and $Ca^{2+}$ cations in the galleries of vermiculite. The exception are the Pinnavaia et al patents discussed below.

Demixed organic/inorganic ion exchanged forms of 2:1 layered silicates can adopt one of several possible structures that are distinguished on the basis of the distribution of the two types of cations in the interlayer galleries. Barrer and Brummer (Barrer, R. M. and K. Brummer, Trans. Faraday Soc. 59:959–968 (1963)) studied by X-ray diffraction the basal spacings and adsorption properties of a series of mixed $CH_3NH_3^+$, $Na^+$- and $(CH_3)_4 N^+$, $Na^+$-montmorillonites. The mixed ion compositions were prepared by ion exchange of $Na^+$-montmorillonaite with aqueous solution of the onium ion salt. They concluded that the compositions were "interstratified" structures. In these interstratified phases, the galleries are occupied by onium-rich and sodium-rich compositions of the exchange cations. That is, the organic and inorganic cations are largely segregated into separate galleries. Also, the stacking sequence of onium-rich and sodium-rich galleries is random. The structure of a randomly interstratified mixed ion 2:1 layered silicate is illustrated schematically in FIG. 1A.

Theng et al (Theng, B. K. G., et al., Clay Miner 7:1–17 (1967)) also have studied the replacement of $Na^+$ and $Ca^{2+}$ ions in montmorillonite by ion exchange reaction with alkylammonium ions in aqueous solution. They concluded, in agreement with Barrer and Brummer, that the products had interstratified, demixed structures.

Vansant and Uytterhoven (Vansant, E. F., et al., Clays Clay Miner 20:47–54 (1972)) studied by thermodynamic methods the partial replacement of $Na^+$ by $(CH_3)NH_3^+$, $(C_2H_5)NH_3^+(C_3H_7)NH_3^+$ and $(C_4H_9)NH_3^+$ onium in montmorillonite. They were inclined to interpret their results in terms of homogeneous mixtures of onium ions and $Na^+$ ions in the galleries (i.e. in terms of a homostructure), but they believed that segregation of the ions into sodium-rich and onium-rich ions occurred upon drying the reaction products.

The homogeneous or uniform mixing of organic and inorganic cations in a smectite clay over an appreciable range of organic to inorganic cation ratios is very rare and limited to one very special reaction system in the known art. Thus, McBride and Mortland (McBride, M. B., et al., Clay Miner. 10:357 (1975)) observed that for the exchange of $Cu^{2+}$ ions in montmorillonite by tetrapropylammonium ions, random interstratification of $Cu^{2+}$ and tetrapropylammonium ions occurred up to 55% exchange. At 55% exchange, and beyond, the $Cu^{2+}$ and tetrapropylammonium ions were distributed as in a homostructured mixed ion clay. This special behavior for homostructure formation, which is schematically illustrated in FIG. 1D, was attributed to the special ability of $Cu^{2+}$ to reduce the degree of hydration by lowering the number of coordinated water molecules from six to four or less. Other inorganic cations do not show like reduction and stability in coordination number and do not form thermodynamically stable mixed ion clay homostructures.

In their studies of the replacement of alkali metal cations ($Na^+$) and alkaline earth cations ($Ca^{2+}$) in vermiculite by a long chain quaternary of the type used for forming organo clays (hexadecyltrimethylammonium, $HDTMA^+$) Xu and Boyd (Xu, S., et al., Soil Sci. Soc. Am. J. 58:1382–1391 (1994) provided examples of "entrapped" mixed ion structures. At $Na^+$ and $Ca^{2+}$ concentrations of 0.005M and 0.001M, respectively, the inorganic cations became difficult to exchange after a certain mole fraction of (~0.6) of exchange sites were occupied by $HDTMA^+$. The inability to displace all of the inorganic cations was attributable to an entrapment phenomenon that limited access to the inorganic exchange sites. Entrapment of the inorganic cation was caused by rapid edge collapse of the galleries around the organic onium ion. Greenland and Quirk, (Greenland, D. J., et al., Clays Clay Minerals 9:484–499 (1962)), observed that hexadecylpyridinium entrapped up to 25% of the $Na^+$ in montmorillonite. Also, McBride and Mortland, (McBride, M. B., et al., Clays Clay Minerals 21:323–329 (1973)), observed that while tetrapropyl ammonium replaced ~50% of the $Ca^{2+}$ from montmorillonite, and only ~10% of the inorganic ions were replaced from vermiculite, McAtee, (McAtee, J. L., J. C. American Mineralogist 44:1230–1236 (1959)) observed that long chain quaternary ammonium ions displaced most of the Na ions from montmorillonite, but entrapped a large fraction of $Ca^{2+}$ at the exchange sites of the same mineral.

Inorganic cation entrapment by organic cations in 2:1 layered silicates can occur by several mechanisms that include a "covering-up" of the inorganic ion by the larger organic cation or a "contraction" of the gallery due to the presence of organic cation. Gallery contraction, however, is not a general mechanism because it requires a small organic cation capable of keying into the layered silicate surfaces to reduce the gallery height. Most onium ions expand the gallery relative to the size of the inorganic cation. Xu and Boyd have pointed out that both the "covering-up" and "gallery contraction" mechanisms are unlikely for onium ion with long alkyl chains. Instead, they favored entrapment. In this mechanism, replacement of the alkali metal or alkaline earth cation by the alkyl chains on the onium ions near the edges of the gallery create a hydrophobic barrier that impedes diffusion of the equated inorganic ions from the gallery. Thus, as illustrated in FIG. 1E, entrapped mixed organic-inorganic cation clays and related 2:1 layered silicates contain both types of ions within a given gallery, but in contrast to the homostructured forms illustrated in FIG. 1D, the ions of entrapped structures are not homogeneously distributed within the galleries and, therefore, are distinct.

Because the organic and inorganic ions are segregated within a gallery, that are entrapped mixed ion structures suffer the same disadvantages that are caused by demixing in phase segregated, interstratified and heterostructured mixed ion structures. However, as emphasized by Xu ad Boyd, entrapped structures are caused by hydrophobic and stearic factors and thus are metastable structures formed in a non-equilibrium exchange process. Phase segregated, interstratified, and heterostructured systems are thermodynamically stable phases formed in equilibrium exchange in an aqueous environment.

On the basis of the current state of the art, the mixing of organic and inorganic exchange cations in smectite clays and related 2:1 layered silicates is limited to compositions in which the fractions of the inorganic exchange cation (alkali metal alkaline earth metal or protons) represents less than 10% of the total cation exchange capacity. Moreover, ion mixing is further limited to onium ions with very short alkyl groups as in the mixed $N(CH_3)_4^+/Cu^{2+}$ and $N(C_3H_7)_4^+/Cu^{2+}$ systems of McBride and Mortland (McBride, M. B., et al., Clay Miner. 10:357 (1975)). Related work by Lee et al (Lee, J.-F., et al., J. Chem. Soc. Faraday Trans. I, 85:2953–2962 (1989)) postulates on the basis of surface area measurements that a small alkylammonium ion, namely $N(CH_3)_4^+$, will randomly displace $Ca^{2+}$ ions on the gallery exchange sites of a smectite clay. But those skilled in the art will know that these homostructured mixed ion clays containing short alkyl groups would not be useful replacements for conventional, homoionic, long chain alkylammonium exchanged forms of smectite clays, because the sort chains alkyl onium ions would lack the hydrophobic character needed to cause gallery intercalation and swelling by organic agents.

U.S. Pat. Nos. 5,853,886 and 6,017,632 to Pinnavaia et al describes the preparation of proton exchanged clays and the use of these clays to form organic exchanged clays. The layered materials were particularly useful for preparing polymeric composites. U.S. Pat. Nos. 5,866,645 and 5,993,769 to Pinnavaia et al describe the preparation of onium ion and inorganic layered silicates and their use in the preparation of polymers.

Among the various applications of organo clays, their use as reinforcing agents, barrier components and Theological control agents for organic polymers is of great commercial value. In general, the polymer-clay composites can be divided into three categories: conventional composites, intercalated nanocomposites, and exfoliated nanocomposites. In a conventional composite, the clay tactoids exist in-their original state of aggregated layers with no intercalation of the polymer matrix between the layers of the clay. The polymer contacts the external surfaces of the clay particle (tactoids) exclusively. In an intercalated nanocomposite the insertion of polymer into the clay layer structure occurs in a crystallographically regular fashion, regardless of the clay-to-polymer ratio. An intercalated nanocomposite normally is interlayered by only a few molecular layers of polymer and the properties of the composite typically resemble those of the ceramic host (Kato, C., et al., Clays Clay Miner. 27 129 (1979); Sugahara, Y., et al., J. Ceram. Soc. Jpn. 100 413 (1992); Vaia, R. A., et al. Chem. Mater. 5 1694 (1993); and Messersmith, P. B., et al., Chem. Mater. 5 1064 (1993)). See also U.S. Pat. No. 4,683,259 to Goodman. In contrast, in an exfoliated nanocomposite, the individual 10Å thick clay layers are separated in a continuous polymer matrix by average distances that depend on loading. Usually, the clay content of an exfoliated clay composite is much lower than that of an intercalated nanocomposite. Consequently, an exfoliated nanocomposite has a monolithic structure with properties related primarily to those of the starting polymer.

The exfoliation of smectite clays in a polymer matrix provides 10Å-thick silicate layers with high inplane plane bond strength and aspect ratios comparable to those found for fiber-reinforced polymer composites. The clays used for nanocomposite formation are ion-exchange forms of smectite clays in which the $Na^+$ and/or $Ca^{2+}$ gallery cations of the pristine mineral have been replaced by organic onium ions. The onium ions may be protonated primary amines ($RNH_3^+$), secondary amines ($R_2NR_2^+$), or they may be tertiary amines ($R_3NH^+$) or quaternary ammonium ions ($R_4N)^+$. The alkyl groups attached to nitrogen may be the same or different, and the alkyl groups may be replaced in part by a benzyl group ($—CH_2—C_6H_5$), a phenyl group ($—C_6H_5$) or by benzyl and phenyl groups. The alkyl groups may also be functionalized, as protonated α, ε-amino acid with the general formula $(H_3N—(CH_2)_n—COOH)^+$. Phosphonium ions may be used in place of ammonium ions for the formation of clay polymer nanocomposites.

Exfoliated clay nanocomposites formed between organocation exchanged montmorillonites and thermoplastic nylon-6 have recently been described (Fukushima, Y., et al., J. Inclusion Phenom. 5 473 (1987); Fukushima, Y., et al., Clay Miner. 23 27 (1988); and Usuki, A., et al., J. Mater. Res. 8 1179 (1993); and WO 93/04117 and 93/04118 describing thermoplastic polymers). Clay exfoliation in the nylon-6 matrix gave rise to greatly improved mechanical, thermal, and rheological properties, making possible new materials applications of this polymer (Usuki, A., et al., J. Mater. Res. 8 1179 (1993); and Kojima, Y., et al., J. Mater. Res. 8 1185 (1993)). Recently clay-reinforced epoxy nanocomposites have been reported (Lan, T. and Pinnavaia, T. J., Chem. Mater. 6 2216 (1994)) by using alkylammonium exchanged smectite clays in a flexible epoxy matrix, Lan. T. and T. J. Pinnavaia, Proceedings of ACS PMSE 71:527 (1994), Avelch et al, Clay Minerals 29:169–178 (1994) and Messersmith et al., Chem. Mater. 1719–1725 (1994)); U.S. Pat. No. 4,810,734 to Kawasuir describe various polymer exfoliated clays, PCT WO 95/14733 and PCT 96/08526 describe polymer exfoliated clays. The reinforcement of the exfoliated 10-Å-thick clay layers was very significant. For instance, 15 wt % of the $CH_3(CH_2)_{17}NH_3^+$-montmorillonite in the epoxy matrix increased the tensile strength 10 times and modulus 8 times. The significant reinforcing benefit provided by the silicate was especially significant for a flexible matrix. U.S. Pat. No. 4,889,885 to Usuki et al. shows thermoplastic vinyl polymer composites containing clay.

For all the polymer-clay nanocomposites reported to date, alkylammonium onium ions, or α, ε-amino acid ions were exchanged into the clay galleries prior to nanocomposite formation, in part, to make the galleries more hydrophobic and better suited for interaction of polymer precursors. These organoclays allow intercalation (access) of monomer species (e.g., ε-caprolactone, epoxy resin and curing agent) into the clay gallery (Usuki, A., et al., J. Mater. Res. 8 1179 (1993), Lan, T. and Pinnavaia, T. J., Chem. Mater. 6 2216 (1994)). Upon polymerization reaction, the monomers form a network in the clay gallery regions and a polymer-clay nanocomposite is formed. By controlling the intra- and extragallery polymerization rate of the monomers, exfoliated and intercalated nanocomposites can be prepared.

Alkylammonium exchanged clays also have been used to form polymer-clay compositions by direct polymer melt intercalation (Vaia et al., Chem. Mater., 7 154 (1995)). The process involves heating a polymer-silicate mixture either statically or under shear in an extruder above the softening temperature of the polymer.

In the previous art, the presence of long chain alkyl onium ions in the clay galleries in place of essentially all of the alkali metal cations was essential for allowing the monomer or the pre-formed polymer to migate into the clay gallery. However, the alkylammonium ions in the gallery can block potentially favorable van der Waals interactions of the polymer matrix with the clay gallery surfaces. Also, the high cost of the alkylammonium ions and complex processing procedures limit the applications of the composites. Furthermore, the alkylammonium ions are toxic and require special handling procedures. Thus reducing the need for alkylammonium exchange cations in forming polymer-inorganic nanolayer composites would be a great practical and economical benefit.

Another problem restricting the use and performance properties of polymer-inorganic nanolayer hybrid composites is the difficulty in forming the composites with the inorganic nanolayers in the preferred exfoliated state. The prior art teaches two general ways of achieving inorganic nanolayer exfoliation in a polymer matrix. One approach is to form the polymer from monomeric polymer precursors or mixtures of polymer precursors in the presence of a layered inorganic ion exchanger interlayered by organic onium ions. However, in many cases the polymerization rate for polymer formation is much slower in the interlayer gallery region of the layered inorganic phase than in the bulk polymer. Consequently, intercalated rather than exfoliated hybrid nanocomposites are formed. Also, this "in situ" polymerization strategy lacks manufacturing versatility in the production of parts with hybrid nanocomposite compositions, because the nanocomposites can only be produced in batches of fixed polymer to inorganic nanolayer ratio.

The second approach to nanocomposite formation mixes a pre-formed thermoplastic polymer with the layered inorganic ion exchanger, typically modified with alkylammonium exchange ions. Melt processing the mixture under applied shear in an extruder can lead to nanocomposite formation under suitable circumstances. But melt processing is limited to thermoplastics with melting temperatures below the decomposition temperature of the onium exchange cation.

Organic-inorganic hybrid composites can exhibit mechanical properties superior to those of their separate components. To optimize the performance properties of these materials, it is usually desirable to disperse the inorganic components in the organic matrix on a nanometer length scale (Giannelis, E. P. JOM 4428 (1992); Gleiter, H. Adv. Mater. 4 474 (1992); and Novak, B. M., Adv. Mater. 5 422 (1993)). Smectite clays and other layered inorganic materials that can be broken down into nanoscale building blocks (Pinnavaia, T. J. Science 220 365 (1983)) are useful for the preparation of organic-inorganic nanocomposites.

U.S. Pat. No. 3,432,370 to Bash et al; U.S. Pat. No. 3,511,725 to Stevens et al, U.S. Pat. No. 3,847,726 to Becker et al and Canadian Patent. No. 1,004,859 to Nelson show various compositions incorporating epoxy resin. U.S. Pat. No. 5,552,469 to Beall et al also describes polymer exfoliated clays. There are numerous uses for these polymer matrices; however, there is a need to improve the properties of these polymers.

In view of the above limitations of the prior art, more versatile processing compositions and processing methods applicable to both thermoset and thermoplastic polymers are needed in order to more efficiently manufacture a broader range of polymer-inorganic nanolayer hybrid composite compositions.

OBJECTS

An object of the present invention is to provide a process for preparing a process for producing clay compositions. A further object of the present invention is to provide for a particulate concentrate composition consisting of a polymer polymerizing component and an inorganic organic cation exchange composition in partially onium exchanged form, that can subsequently be mixed with a polymer precursor, a mixture of polymer precursors or a polymer melt (that is a thermoplastic polymer under melt processing conditions) to form polymer-inorganic nanolayer hybrid composites with improved mechanical performance properties related to the unreinforced cured polymer.

Another object of the present invention is to provide for hybrid nanocomposite compositions of a cured polymer matrix and inorganic nanolayers, wherein the clay nanolayers function as reinforcement agents and as barriers to permeants, thus improving the strength, dimensional stability and solvent resistance and wherein the initial exchange cations on the inorganic nanolayers are onium ions and protons.

Another object of the present invention is to provide a low cost, high-speed, environmentally benign process for producing the particulate concentrate compositions and the polymer-inorganic nanolayer hybrid composites.

These and other objects will become apparent from the following description and the drawings.

SUMMARY OF THE INVENTION

The present invention relates to a process for the preparation of homostructured mixed organic and inorganic cation exchanged layered silicate with galleries between the layers, wherein the galleries between the silicate nanolayers of the said homostructure are co-occupied by protons and onium ions in a molar ratio of protons to onium between about 10 to 90 and 90 to 10, which comprises:

(a) providing an inorganic layered silicate in exchanged proton exchanged form; and (b) intercalating an organic onium ion precursor into the layered silicate which react with the protons in the galleries to form the organic and inorganic cation exchanged layered silicate containing the onium ions and the protons.

The process is shown schematically in FIG. 2 and the layered silicate is shown in FIG. 3.

The present invention also relates to a process for the preparation of homostructured mixed organic and inorganic cation exchanged layered silicate with galleries between the layers, wherein the galleries between the silicate nanolayers of the said homostructure are co-occupied by protons and onium ions in a molar ratio of protons to onium between about 10 to 90 and 90 to 10, which comprises:

(a) providing an inorganic layered silicate; and (b) co-intercalating in a solvent an organic onium ion and protons into the layered silicate to form the homostructured mixed organic and inorganic cation exchanged layered silicate.

BRIEF DESCRIPTION OF THE DRAWINGS

FIGS. 1A to 1E show various types of layered silicates with inorganic ions (I) and organic ions (O) separating galleries containing inorganic ions and organic ions.

FIG. 2 is a schematic diagram of the process of the present invention producing the homostructured layered silicates of the present invention containing protons ($H^+$) and onium ions ($O^+$).

FIG. 3 is a detailed schematic view of the structure of FIG. 1D containing the onium ions (+N . . . ) And protons ($H^+$).

DESCRIPTION OF PREFERRED EMBODIMENTS

Figure 4:
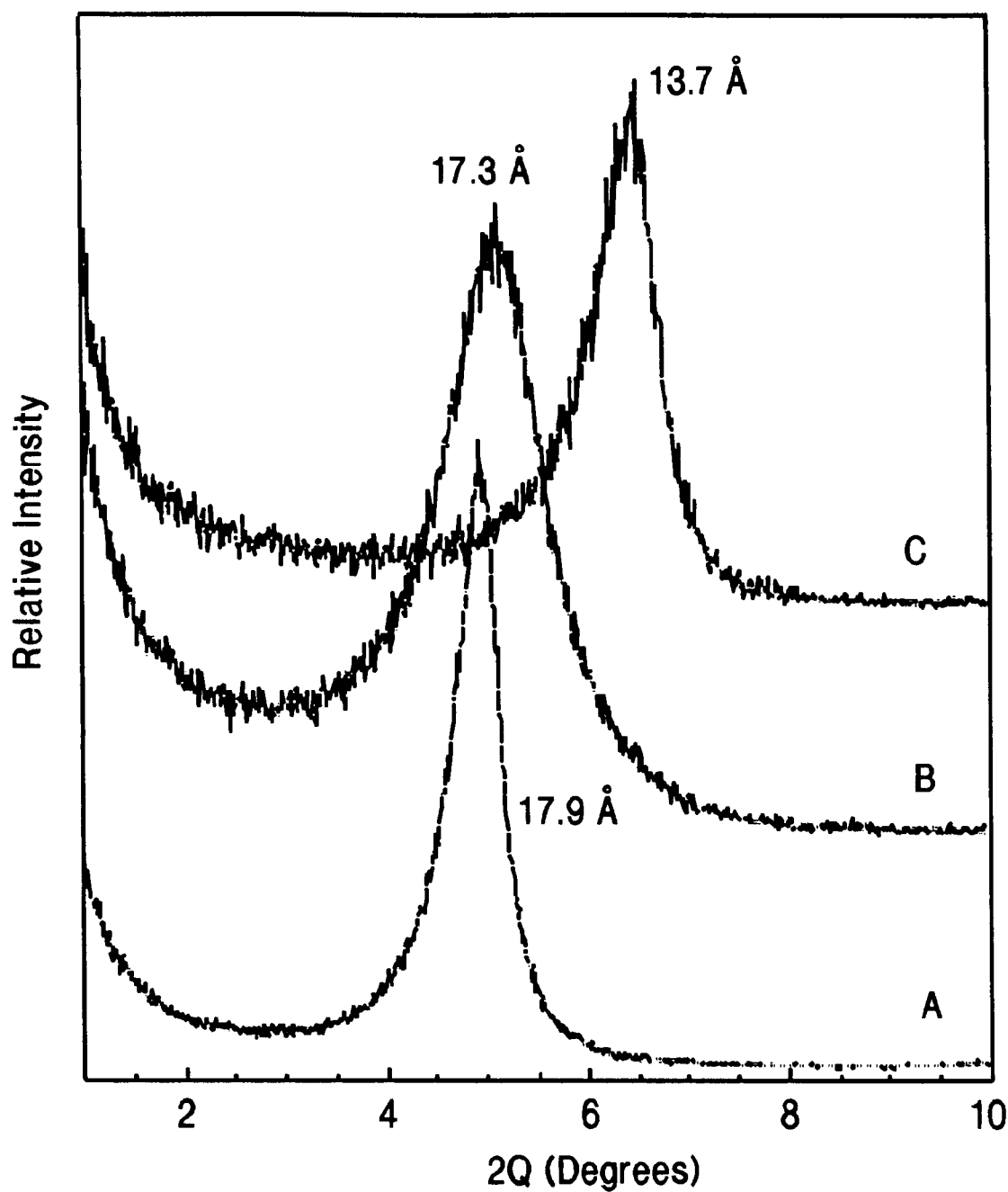
FIG. 4 is a graph showing XRD patterns of (A) fully octadecylammonium exchanged montmorillonite (Swy-2, CEC=90 meq./100 g); (B) and (C) are for homostructured mixed octadecylammonium ion and proton clay structures with the compositions of onium ions to protons near 55:45 and 33:67, respectively. The homostructured clays were obtained by reaction of a proton exchanged form of clay with a neutral amine wherein the proton clay was formed using ion-exchange resin method.

The polymer composites can be thermosets or thermoplastics. A broad class of layered cation exchange compositions may be utilized as inorganic nanolayers. In the preferred embodiment of the invention a member of the 2:1 layered silicate family of ion exchangers is selected for the formulation of the particulate concentrate composition. Less preferred layered inorganic cation exchanger compositions, including crystalline layered sheet silicates, phosphates, arsenates, titanates, vanadates, niobates, molybdates, manganates and uranyl compounds may be selected.

The particulate concentrate compositions are formed by intercalation of a polymer polymerizing component into the galleries of an exchanged form of the homostructured layered inorganic composition which has cation exchange sites occupied by onium ions and proton, in the nanolayers in a mole ratio between about 10 to 90 and 90 to 10. A polymer polymerizing component can be defined as any reagent containing a functional group capable of polymerization reaction with a polymer precursor or a mixture of polymer precursors. The polymer polymerizing agent can also contain a basic functional group for reaction with the gallery protons of the inorganic ion exchanger. The functional groups on the polymer polymerizing agent and polymer precursor may be identical or different in chemical structure.

Reaction of the intercalated particulate concentrate with a polymer precursor or mixture of polymer precursors affords a cured polymer-nanolayer hybrid composite with mechanical performance properties greatly superior to the pristine cured composite. A reduction in the number of alkylammonium ions on the exchange sites of the inorganic nanolayers optimizes interfacial interactions and enhances the mechanical strength of the polymer phase. In addition, the cured polymer-nanolayer composites exhibit improved resistance to permeation by gases and to swelling by organic solvents. These latter properties improve the performance of the composites as engineering materials and as barrier films, sealants and the like. Also, the integrity of the composites is improved by the reduction of the alkylammonium ions, thus improving the dimensional stability of the composites in the presence of solvents and the resistance of the composite to crazing and cracking. Furthermore, the adhesive strengths of the elastomeric nanocomposites embodied in this invention is improved by the reduction of alkylammonium ions.

The present invention thus particularly relates to a particulate composition used to prepare a polymer and layered inorganic composition composite which comprises:

a polymer component intercalated into the particles of a layered inorganic composition with nanolayers and with galleries between the nanolayers wherein the layered inorganic composition has cation exchange sites occupied by onium ions and protons, in each of the galleries in a mole ratio of onium ions to inorganic ions of between about 10 to 90 and 90 to 10, wherein in use of the particulate composition the nanolayers are separated by a polymer precursor or polymer melt which is introduced into the galleries of the inorganic layered composition and combines with the polymer component and wherein the weight ratio of the polymer component to layered inorganic composition is between about 1:100 and 100:1.

The present invention also relates to a particulate composition used to prepare a polymer and 2:1 layered silicate hybrid composite which comprises:

a polymer component intercalated into particles of a 2:1 layered silicate with nanolayers and with galleries between the nanolayers wherein the 2:1 layered silicate has cation exchange sites occupied by onium ions and protons, in each of the galleries in a mole ratio of onium ions to inorganic ions of between about 10 to 90 and 90 to 10; and wherein in use of the particulate composition the nanolayers are separated by a polymer precursor which is introduced into the galleries of the 2:1 layered silicate wherein the weight ratio of the polymer component to the 2:1 layered silicate is in the range 1:100 to 100:1.

The present invention further relates to a hybrid organic-inorganic composite material containing a cured polymer and particles of a layered inorganic composition having galleries between the layers, the galleries containing the polymer, wherein the layered inorganic composition has cation exchange sites occupied by onium ions and protons, in each of the galleries in a moled ratio of onium ions to inorganic ions of between about 10 and 90 and 90 and 10, wherein the ratio by weight of cured polymer to the layered inorganic composition is between about 200;1 and 1:100, wherein an average separation between the layers corresponds to a height of the galleries of about 0.4 to 300 nm and wherein the particles have an average diameter of between about 20 and 20,000 nm and a ratio of diameter to thickness of the particles in a range between about 20,000:1 and 20 to 1.

The present invention also relates to a hybrid organic-inorganic composite material containing a cured polymer and particles of a layered 2:1 layered silicate particles having galleries between the layers, the galleries containing the polymer, wherein the silicate has cation exchange sites which are occupied by onium ions and protons in each of the galleries in -a mole ratio of onium ions to inorganic ions of between about 10 to 90 and 90 to 10 prior to curing of the polymer, with the proton bonded to the polymer, wherein the ratio by weight of polymer to layered silicate is between about 200:1 and 1:100, wherein an average separation between the layers corresponds to a height of the galleries of about 0.4 to 300 nm and wherein the particles have an average diameter of between about 20 and 20,000 nm and a ratio of diameter to thickness of the particles in a range between about 20,000:1 and 20:1.

The present invention also relates to a method for the preparation of a composition which comprises:

(a) providing a 2:1 layered silicate with nanolayers and sites occupied by onium ions and protons, alkali metal and alkaline earth metal ions in each of the galleries in a mole ratio of onium ion to inorganic ions of between about 10 to 90 and 90 to 10 prior to curing of the polymer with the proton bonded to the polymer, wherein the ratio by weight of polymer to layered silicate is between about 200:1 and 1:100, wherein an average separation between the layers corresponds to a height of te galleries of about 0.4 to 300 nm and wherein the particles have an average diameter of between about 20 and 200,000 nm and a ratio of diameter to thickness of the particles in a range between about 20,000:1 and 20 to 1; and (b) intercalating a polymer component into the galleries of the 2:1 layered silicate, wherein the composition can be mixed with a polymer.

The present invention also relates to a method for the preparation of a cured polymer composite comprising a polymer component and a layered inorganic component with nanolayers and galleries between the monolayers wherein:

(i) the layered inorganic composition has cation exchange sites occupied by onium ions and protons in each of the galleries in a mole ratio of onium ion to inorganic ions between about 10 to 90 and 90 to 10;

(ii) a polymer precursor or polymer melt;

(iii) the inorganic layers are separated by the polymer precursor or polymer melt in the galleries; and (iv) the weight ratio of the polymer precursor or polymer melt to the layered inorganic composition is between about 1:100 to 100:1, wherein said method comprises:

(a) providing in a mixture the composition with the polymer precursor or polymer; and (b) mixing the mixture at a temperature and for a time to produce the polymer composite, wherein the galleries contain the polymer.

The present invention further relates to a method for the preparation of a polymer composite prepared from a composition comprising a polymer and a homostructured 2:1 layered silicate with nanolayers and galleries between the monolayers wherein:

(i) the homostructured 2:1 layered silicate has cation exchange sites occupied by onium ions and protons in each of the galleries in a mole ratio of onium ions to inorganic ions between about 10 to 90 and 90 to 10;

(ii) a polymer precursor or polymer melt;

(iii) the silicate layers are separated by the polymer precursor or polymer in the galleries and (iv) the weight ratio of the polymer precursor or polymer to the layered silicate is between about 1:100 to 100:1, wherein said method comprises:

(a) providing in a mixture the composition with a polymer precursor or polymer melt; and (b) mixing the mixture at a temperature and for a time to produce the cured composite, wherein the galleries contain the polymer.

The present invention provides a useful, low cost mixed organic/inorganic cation exchanged clays by a general method of mixing the organic and inorganic ions over a broad range of relative concentrations. Moreover, the method allows mixing of onium ions with long-alkyl chains with carbon numbers of six or larger. The invention provides a method for preparing homostructured mixed organic/inorganic ion exchanged forms of 2:1 layered silicates that have been previously unknown in the prior art.

The instant invention provides for homostructured mixed organic-inorganic cation exchanged forms of smectite clay and related 2:1 layered silicate compositions. These compositions have the organic and inorganic exchange cations distributed sufficiently uniformly within the galleries to form tactoids with uniform intercalation properties. Depending on the specific 2:1 layered silicate the mixed ion homostructures exhibit at least one X-ray diffraction line with a basal spacing that will depend on the size of the onium ion and the nature of the 2:1 layered silicate. In general, these compositions exhibit a gallery polarity that is intermediate between the parent end members homoionic organic and inorganic clays. Moreover, the polarity can be varied by choice-of the relative fractions of organic and inorganic cations that co-occupy the galleries of the homostructure. In general, the organic cation to inorganic cation mole ratio is in the range 10:90 to 90:10, and more preferably in the range 30:70 to 70:30. Consequently, the intercalation properties and, therefore, the performance properties of these compositions or adsorbents, rheological control agents, components for the formation of polymer nanocomposites, and other intercalation-dependent applications, can be controlled by the choice of organic to inorganic ion ratio, the choice of organic and inorganic exchange cations and the choice of the 2:1 layered silicate.

The inorganic cation is a proton (hydronium ion). The organic cations are selected from the group comprising onium ions, most preferably primary, secondary, tertiary and quaternary ammonium ions. Those skilled in the art will know that related onium ions of phosphorous and arsenic are useful replacements for ammonium ions, but these ions are generally less preferred because they are more expensive and toxic. All of the smectite clays are suitable 2:1 layered silicates, as well as those higher charge density analogs that function as cation exchangers. More specifically, the 2:1 layer silicates are selected from the group comprising montmorillonite, hectorite, fluorohectorite, saponite, beidellite, nontronite, stevensite, vermiculite, hydromicas, synthetic smectites, laponite, taneolite, and tetrasilicic mica, and the regularly ordered mixed layered clay rectorite.

The mixed ion compositions of the instant invention are made to be thermodynamically stable by minimizing differences in the salvation energies of the organic and inorganic exchange cations. A lowering of salvation energy differences can be achieved by replacing the water normally used in the prior art of ion exchange reactions with a water-polar organic solvent mixture. Thus, in one embodiment of the present art a water:ethanol mixture is used to replace the H$^+$ exchange ions of hectorite. A demixed, phase-segregated structure is initially formed in accordance with the teaching of the prior art. However, the demixed ethanol suspension undergoes ion redistribution reaction in the water:alcohol medium to form stable homostructures upon further reaction for periods of four or more days. This overall conversion can be represented by the reaction sequence:

$$I^+\text{-clay} + O^+_{(soln)} \rightarrow O^+\text{-clay} + I^+_{(soln)} \qquad \text{(eq. 1)}$$

wherein I$^+$ is the inorganic cation and O$^+$ is the organic cation. The O$^+$/I$^+$-clay initially is a demixed ion structure which is subsequently transformed upon long reaction time to a homostructured clay. Those skilled in the art will know that other polar organic solvents can be used in place of ethanol to stabilize homostructured mixed ion clays. The polar organic solvent component can be selected from the group comprising ethanol, methanol, isopropanol, acetone, acetonitrile, glycol, glycerol and other polyethylene glycols. The water can be replaced in part or in total by the polar organic component, but a mixture with water generally is preferred.

Another very important and greatly preferred embodiment of the instant art is the facile formation of stable homostructured mixed ion clays within minutes at ambient temperature by ion redistribution reaction between homoionic parent end member clays in a suitably polar liquid medium such as a water:ethanol mixture. The highly preferred ion redistribution pathway can be expressed as follows by (eq. 2);

$$O^+\text{-clay} + I^+\text{-clay} \rightarrow O^+/I^+\text{-clay} \qquad (eq.\ 2)$$

Because the reaction is rapid, usually occurring within minutes at ambient temperature, the redistribution pathway of (eq. 2) is greatly preferred over the ion exchange pathway of eq. 1. The absence of free electrolyte in the reaction medium greatly reduces the time needed for achieving homostructure formation. Also, homoionic $O^+$-clays and $I^+$-clays are easily prepared and are standard items of commerce. Thus homostructured $O^+/I^+$-clays can simply be prepared by mixing the parent end members in an appropriate solvent.

Yet another advantage of the ion redistributing pathway of eq. 2 is that it allows for the facile formation of homostructured forms comprising the layers of two or more different clays. The mixing of layers from two different clays, say clay A and clay B, to form a homostructured product can be illustrated by (eq. 3):

$$O^+\text{-clay A} + I^+\text{-clay B} \rightarrow O^+/I^+\text{-cay A/B} \qquad (eq.\ 3)$$

Thus, the redistribution pathway allows for the mixing of clays with different but complementary layer aspect ratios and compositions for improved materials performance. Also, a reduction in the cost of production of homostructured mixed ion clays may be realized by the added flexibility in selecting homoionic parent and members. That is, it may be desirable in some instances for reasons of achieving improved performance or reduced cost to mix an organic vermiculite with an inorganic smectite or to mix the organic and inorganic exchange forms of different smectites (i.e., montmorillonite/laponite) in forming the homostructured mixed ion clay. One skilled in the art may also anticipate mixing layered structures from two very different families, for example an inorganic cation exchanged 2:1 layered silicate and an organic cation exchanged layered sulfide or phosphate.

Those skilled in the art know that x-ray diffraction patterns of powdered or oriented thin film samples are commonly used to describe smectite clays and related 2:1 layered silicates. The diffraction pattern typically provides a measurement of the basal spacing between the stacked layers. Mixed ion systems with phase segregated structures typically exhibit the basal spacings characteristic of the homoionic intercalates that comprises the structure. Entrapped mixed ion systems also may exhibit diffraction peaks corresponding to two basal spacings if the organic and inorganic ions co-occupying the galleries are well segregated within the galleries and if the segregated regions are well stacked one upon the other in the tactoid. Otherwise, only a single basal spacing indicative of the average repeat distance between stacked layers will be observed. Randomly interstratified mixed ion phases typically exhibit one basal spacing that represents the weighted average of the spacings represented by the demixed organic and inorganic galleries contained in the tactoid. Thus, the observed spacing will typically vary within the ratio of organic to inorganic cations in the interstratified structure.

One might expect the basal spacing of a homostructured mixed ion clay to be the same as the spacing found when only the larger cation, typically the organic cation, occupies the gallery. That is, the spacing may not be expected to vary with organic to inorganic cation ratio because the smaller inorganic cations can in principle be accommodated between the larger organic cations. However, composition-invariant basal spacings are seldom the case for homostructured systems because the orientation of the organic cation in the homostructure will vary with the organic cation to inorganic cation ratio. Depending on the space available to the organic ions in the gallery, which in turn will be dependent on the ratio of organic to inorganic ion, the alkyl chains of the onium ion will adopt orientations in which the angle defined by the chain axis and the silicate layer varies from 0° to 90°. Similar chain reorientation also will occur in other mixed ion solids. Also, the charge density on the layers of 2:1 layered silicates can vary within a single tactoid. This charge variation leads to a change in the number and orientation of onium ions from one gallery to the next.

In view of the above considerations, the homostructured mixed ion compositions of the present invention typically exhibit a basal spacing that varies with onium ion to inorganic cation ratio. In this regard the XRD properties of homostructured systems may be similar to and even indistinguishable from those of interstratified systems. However, the homostructured mixed ion clays of the instant invention exhibit novel intercalation properties that makes them valuable materials for adsorption applications, for controlling the rheology of fluids, for the formation of nanostructured composites and other useful applications. Because each of the galleries comprising the tactoids of the homostructured composition of the instant invention contains homogeneously distributed onium ions and inorganic cations, the polarity and hence the intercalation properties of the galleries are similar. Therefore, it is possible to uniformly intercalate essentially all galleries within the tactoids for optimum dispersion in a fluid or polymer or for adsorption of guest molecules within the galleries. The methods used in forming the structures of FIG. 3 are shown in FIG. 2. Process A is a two step process wherein the protonated clay is formed first. Process B involves the addition of acidified organic amine (with a molar excess of proton).

Those skilled in the art of ion exchange know that the ion exchange reactions of turbostratic smectite clays in liquid suspensions normally occur very rapidly (within minutes) at room temperature. Related high charge density 2:1 structures with three-dimensional order such as vermiculite or paragonite, muscovite and other micas are much slower to exchange and may require multiple exchange treatments at elevated temperatures for reaction times of several days. The very fast ion exchange reactions of smectites, as judged from the results of the current art, almost always (with the exception of small organic ion-inorganic ion systems cited above) affords segregated mixed ion forms. Thus one skilled in the art would expect that because the ion exchange kinetics are fast, one should readily achieve the thermodynamically most stable state of the system. Therefore, one skilled in the art would conclude that the ion-segregated phases obtained upon partial replacement of inorganic cations by organic cations in smectite clays represent the most thermodynamically stable states of the compositions. However, the teachings of the instant invention, as demonstrated in the examples below, show that homostructured mixed ion phases can be formed over a broad range of organic ion to inorganic ion ratios.

More specifically, the art of the instant invention also teaches that the segregated, mixed ion exchanged forms of smectite clays can be transformed into the desired homostructured forms by facile, low-cost ion-redistribution reactions at ambient temperature. Furthermore, the redistribution reaction can be used to restructure homoionic end-member organic and inorganic exchange forms of smectite clays into useful homostructured derivations. These redistribution reactions are general, and can be extended to other members of the 2:1 layered silicate family of cation exchanges.

The homostructured organo/inorgano clay can be prepared with direct ion exchange reaction of the inorganic exchange proton form of the clay with an onium ion precursor containing clay to form onium ions. The onium ions include primary, secondary, tertiary and quaternary alkyl ammonium, phosphonium and arsonium ions.

The homostructured organo/inorganic clay can be used to prepare polymer-clay nanocomposites. The polymers can be thermosets such as epoxy, polyurethane, polyurea, polysiloxane and alkyds or thermoplastics such as polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactones, polylactides, polyimides, and polyolefins. The said organo/inorganic clays also can be used as sorbents for organic waste removal, Theological additives for paints and as carriers and supports of agents for agriculture applications and chemical catalysis.

There are many families of layered inorganic providing the objects of the present invention. Among the various families described in Tables 1 and 2, the smectite clays are preferred owing to their low cost and availability as natural or synthetic minerals.

Proton exchanged 2:1 layered silicates are prepared by simple ion-exchange reaction or by thermal conversion of the ammonium exchanged forms of the minerals. Proton exchanged smectite clays and related 2:1 layered silicates typically have basal spacings between 1.0 and 1.5 nm, depending in part on the degree of gallery hydration as shown in FIG. 2.

Figure 5:
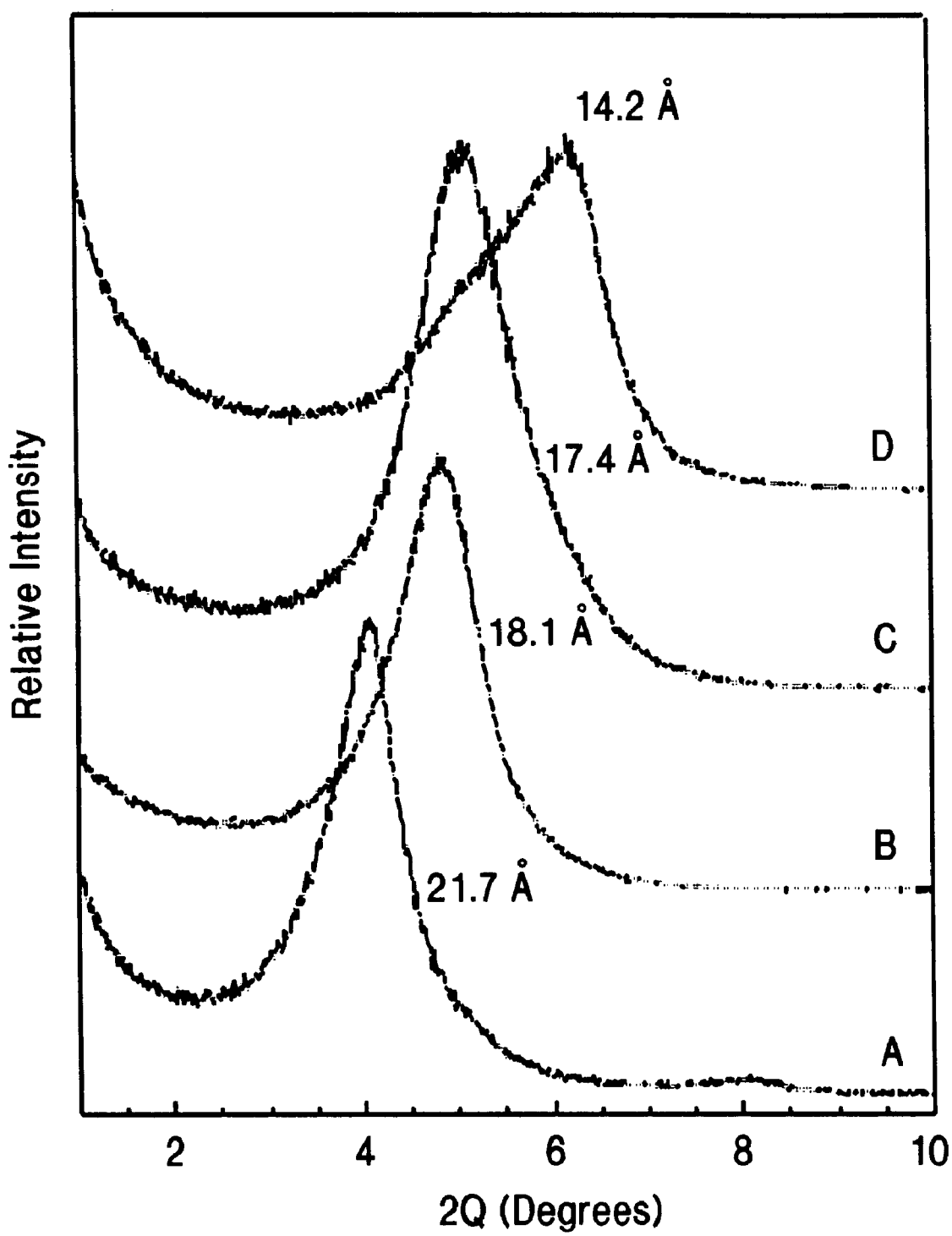
FIG. 5 is a graph showing XRD patterns of (A) fully octadecylammonium exchanged CWC montmorillonite (Sodium form CWC clay from Nanocor, Inc., CEC=140 meq./100 g); (B), (C) and (D) are for homostructured mixed octadecylammonium ion and proton CWC clay structures with the compositions of onium ions to protons near 65:35, 50:50 and 35:65, respectively. The homostructured clays were obtained by reaction of a proton exchanged form of clay with a neutral amine wherein the proton clay was achieved by direct proton exchange reaction of sodium form clay with a Bronsted acid.

Many polymer polymerizing components contain basic groups. For instance, amines are a widely used class of polymer polymerizing components acting especially as "curing agents" for epoxy resins. The acidic protons in the layered silicate galleries are readily combined with basic groups on this class of polymer polymerizing component. Once the amine is adsorbed partially by the onium exchanged form of the clay, the average separation between the layers increases from 5 Å to 120 Å or beyond, depending on the amount and the size of the adsorbed component. FIG. 5A illustrates the structural features of the curing agent-intercalated silicate concentrate.

The curing agent-intercalated silicate concentrate can react with a mixture of epoxy resin and additional curing agent in stoichiometric amount to form a cured epoxy-nanolayer hybrid composite. In FIGS. 5B and 5C, the intercalated curing agent of the concentrate, together with additional curing agent react with the polymer resins to form a cross-linked network in the clay galleries. Ideally, for the preparation of the final hybrid nanocomposite the polymer precursor and the curing agent are mixed in stoichiometric or nearly stoichiometric amounts so that all or nearly all of the polymer precursor has been cross-linked by reaction with the functional groups on the curing agent. When present, the proton acidity of the clay helps in catalyzing the intragallery cross-linking polymerization reaction. In the final hybrid nanocomposite the protons are bound to the basic atoms that are a part of the cross-linked polymer network. In other words, the cured polymer is protonated only to the extent necessary to balance the silicate layer charge.

In order to illustrate the utility of homostructured partially onium exchanged clays for forming layered particulate concentrates and the use of the concentrates in forming cured polymer-inorganic nanolayer hybrid composite compositions, additional descriptions are provided of a cured polymer system, wherein the curing agent is an amine and the resin is an epoxide. However, the invention of polymer polymerizing component-particulate concentrates and the cured polymer-inorganic-organic nanolayer hybrid composites formed from the concentrates is not limited to epoxys only or to 2:1 layered silicates only. The invention is generalized and applied to other thermoset polymer systems, such as polyurethane, polyurea, polysiloxane and alkyds, where polymer curing involves coupling or crosslinking reactions. Also, any of the partially onium ion-exchanged forms of the layered inorganic cation exchange compositions can be used in place of a protonated 2:1 layered silicate.

Further, those skilled in the art of hybrid nanocomposites will know that the disclosed technology also applies to thermoplastic polymer system. For instance, those skilled in the art will know that if the amine groups of an epoxy curing agent lead only to linear chain formation, the cured epoxy matrix will be thermoplastic. For example, the monoamines, and di-secondary amines shown below will form thermoplastic epoxy polymers:

The same principle of formulating and using a polymer polymerizing compound-layered inorganic intercalate concentrate for cured polymer-inorganic nanolayer hybrid formation applies to thermoplastic polymer systems in general. The cured thermoplastic polymer hybrid nanocomposites can be prepared from a polymer polymerizing agent intercalated in a layered inorganic cation exchanger by reaction of the particulate concentrate with an appropriate monomeric reagent. Alternatively, the particulate concentrate may be combined with a polymer melt to form the nanocomposite. In this latter case the process of nanolayer dispersion is equivalent to dispersing the particulate concentrate in a liquid monomer or a mixture of monomer. Coupling of the polymer polymerizing component of the particulate concentrate may occur by reaction with end groups or other reactive centers on the backbone of the molten cured polymer. Alternatively, the polymer polymerizing component and the polymer melt can bind by entanglement. All thermoplastic polymers can benefit from the disclosed technology. The thermoplastic polymers of relevance include polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactones, polylactides, polyimides, and polyolefins (vinyl-containing thermoplastics).

It is important to emphasize that the particulate concentrate compositions can be formed from any polymer-polymerizing component with the layered inorganic cation exchange composition. For instance, in the case of an amine-clay concentrate for preparation of a cured epoxy-layered silicate hybrid nanocomposite, the layered particulate concentrate is made by intercalating the inorganic phase with an amino-functional reagent, which is termed a "curing agent" by those skilled in the art, or, more generally for the purpose of the present invention, a "polymer polymerizing component". However, a particulate concentrate composition useful for forming cured epoxy nanocomposites can alternatively be formed by reaction of the epoxy resin with the partially onium ion exchanged clay. In this case, the intercalated epoxy resin functions as the polymer polymerizing agent. But, in this case care is needed in selecting the processing conditions so that epoxide ring opening and self-polymerization reactions are avoided.

Thus, the concept of forming a layered particulate concentrate for the preparation of thermoset polymer-inorganic nanolayer hybrid composites is a general one and can be applied to many thermoset polymer systems other than epoxides. For instance, silicone elastomers are generally formed by the reaction of siloxane oligomers with silicon alkoxide crosslinking agents. A typical cured polymer system is illustrated as follows:

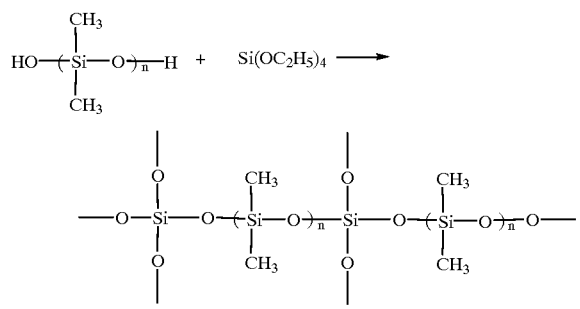

According to the teaching of the present invention, siloxane elastomer-inorganic nanolayer composite can be formed from an intercalated particulate concentrate containing a siloxane polymerizing component and subsequently mixing the concentrate with the necessary amounts of polymer precursor

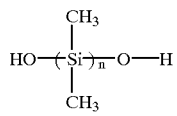

under the conditions necessary for curing the polymer. Examples of suitable siloxane polymer polymerizing component are those containing an amino group, such as: $H_2N(CH_2)_3Si(OR)_3$, where R is an alkyl group, or $H_2N(CH_2)_3HN(CH_2)_3Si(OR)_3$, and many others that are readily available on a commercial basis (e.g., see Gelest Inc. Catalog (1996), Tullytown, Pa.).

Furthermore, polyurethane polymers are prepared by reaction of isocyanate and polyols:

-continued

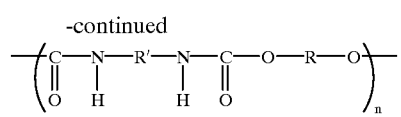

The concentrates are used to react with appropriate amounts of polyols and isocyanate under conditions necessary to form cured polyurethane-inorganic nanolayer hybrid nanocomposites.

Furthermore, alkyd polymer matrices, formed as illustrated in the following systems are adaptable to the teachings of this invention for formation of hybrid nanocomposites. Glycerol can be intercalated partially onium ion exchanged inorganic cation exchangers, and the resulting concentrates are suitable for nanolayer composite formation.

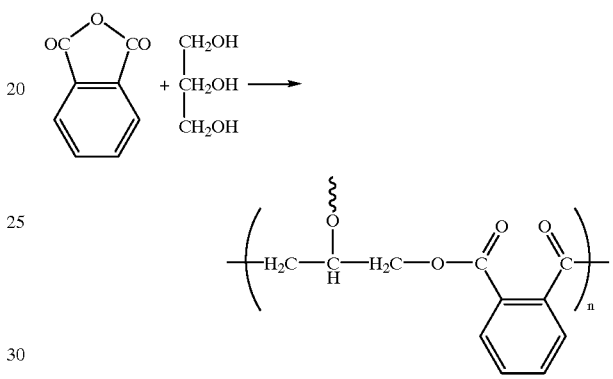

As stated earlier, the present invention relates in part to polymer precursor-2:1 layered silicate intercalate concentrate compositions and methods to prepare them. The silicates mineral should have certain ion exchange properties as in smectite clays, rectorite, vermiculite, illite, micas and their synthetic analogs, including laponite, synthetic mica-montmorillonite and tetrasilicic mica. The silicate layers in the concentrate composition have an average diameter of between about 200 and 20,000 Å and a ratio of diameter to thickness of the particles in a range between about 2000 and 20 to 1.

The proton exchanged forms may be prepared by any of several possible methods, including direct ion exchange with a mineral acid, ion exchange with the proton exchange form of an ion exchange resin such as Dowex or Amberlite resins, or by thermal decomposition of the ammonium form. Typically at least 10% of the exchange sites are occupied by protons, and all of the silicate exchange sites not occupied by an onium ion can be protonated.

The intercalation of a basic polymer polymerizing component into the protonated mixed ion clay can be achieved by using solvent and solvent-free processes. In the solvent-based process, the polymer polymerizing component is placed in a solvent that is inert toward polymerization or coupling reaction. For a polyetheramine, for example, the intercalation can be carried out in single or mixed solvent system. Particularly suitable solvents are water or water-ethanol, water-acetone and like water-polar co-solvent systems. Upon removal of the solvent, the intercalated particulate concentrates are obtained. In the solvent-free process, a high shear blender is usually required to conduct the intercalation reaction. The said polymer polymerizing component-particulate intercalate concentrates may be in a suspension, gel, paste or solid forms.

In thermoset polymer processing one of the reagents is typically referred to as the curing agent and the epoxide-functional component is call the "resin" or "polymer" precursor. In the formation of epoxy thermoset polymers, for example, the epoxide reagent is typically referred to the resin precursor and the crosslinking agent, typically an amine, is termed the curing agent. When the present invention is applied to an epoxy polymer system, or to a related thermoset polymer matrix, the polymer polymerizing component of the layered particulate concentrate requires functional crosslinking groups for curing the polymer resin or precursor. Amine groups are preferred basic groups they are capable of crosslinking certain resins, (especially epoxy) to form a cured polymer. The polymer polymerizing component can have other functional groups for coupling or crosslinking reactions, for example, an acid anhydride and/or an amide group in the case of curing an epoxy polymer.

The preferred partially onium ion exchanged forms of the 2:1 layered silicates embodied by this invention include naturally occurring and synthetic forms of smectites with layer charge densities of 0.4–1.4 $e^-/O_{20}$ unit, such as montmorillonite, hectorite, saponite, nontronite, beidellite, fluorohectorite, and laponite, and mixed layered 2:1 silicates such as rectorite, synthetic mica montmorillonite, and illite and vermiculite and mica-like compositions containing up to 2.0 $e^-/O_{20}$ unit cell such as muscovite, biotite, phlogopite, synthetic mica montmorillonite, taeniolite, and tetrasilicic mica. The silicate layers have a particle size between about 200 and 200,000 Å and a ratio of diameter to thickness in a range between about 20,000 to 1 and 20 to 1. The broad range of particle sizes, ion exchange capacities and the low cost of these layered inorganic ion exchangers are highly preferred.

The proton exchanged 2:1 layered silicates can be prepared by several different routes but the following three general methods are most preferred. The partially onium ion exchanged silicates prepared from the said three methods exhibit identical powder X-ray diffraction patterns, and are equally well suited for forming intercalated polymer polymerizing component-layered particulate concentrated. The partially onium ion exchanged layered silicates retain their platy morphology. The proton-containing gallery regions of the homostructure are sufficiently expanded and readily take up guest molecules. The 2:1 layered silicate partially onium ion exchanged for the formation of useful particulate concentrate compositions, but at least 10% by number of the cation exchange sites of the mineral should be replaced by onium ions.

Polyetheramines or polyamides used in the present invention as examples of epoxy polymerizing components are soluble in $H_2O$ or in $H_2O$ ethanol mixed solvents. The addition of a polyetheramine or polyamide to partially onium ion-exchanged layered silicate homostructure in $H_2O$ or $H_2O$/EtOH suspension, and the polyetheramine or polyamide guest molecules are readily intercalated in the galleries between the layered silicate nanolayers. A typical polyetheramine such as JEFFAMINE D2000 (Huntsman Chemicals, Houston, Tex.), when intercalated into a homostructured onium ion-proton exchanged-montmorillonite, gives rise to a basal spacing of 45 Å. In the solvent-free process, the dried homostructured clays and the polyetheramine or amide are mixed in a blender (e.g., Waring Commercial Blender) and blended at high speed. The mixing at the solid-liquid interface results in the intercalation of the polymer precursor into the silicate galleries. By adjusting the weight ratio of the curing agent and the silicate, one can control the morphology of the polymer polymerizing component-layered silicate intercalate concentrate to obtain a powder, paste or gel. The weight ratio of amine curing agent to smectite is in the range of 1:100 to 200:1, and more preferably 1:5 to 20:1. The choice of the concentrate in powdered, gel, or liquid suspension form depends on the preferred conditions for processing the cured nanocomposite, particularly on the desired loading of the layered silicate in the cured composites. For example, the powdered form of the concentrate allows maximum loading of silicate in the final cured nanocomposite. But if a low silicate loading is desired, it is more convenient to form the cured composite from the concentrate in liquid form.

The powdered, gel-like or suspension forms of the inorganic particulate concentrates all are useful for forming cured polymer-inorganic nanolayer hybrid composites. The powdered forms are higher in inorganic content and can be used to form cured polymer-nanolayer hybrid composites with proportionately higher final reinforcement properties. The gel and suspension forms of the particular concentrates are convenient for forming nanolayer composites with lower inorganic content for use as coatings and films.

The polymer composites of this invention are distinguishable from composites made from fully alkylammonium exchange forms of 2:1 layered silicates in three important ways: (1) the initial silicate has reduced alkylammonium exchange ions that can interfere with favorable binding interaction between the polymer and the silicate surface and (2) the composites exhibit tensile strength and modulus substantially better than composites made from fully alkylammonium exchanged clays and (3) the hybrid composites prepared from proton exchanged 2:1 layered silicates are more resistant to swelling by organic solvents.

The separation between the nanolayers in the cured polymer composites can be ordered or disordered with regard to their ability to exhibit X-ray diffraction patterns. If the nanolayer separation is ordered (FIG. 5B) with a regular separation between layers, one or more 001 Bragg XRD reflection is observed. If the nanolayer separation is disordered (FIG. 5C), i.e., highly variable, then the Bragg scattering is very broad, and in most cases unobservable by routine XRD techniques. In general, the cured polymer-nanolayer hybrid composites of the present invention are of the disordered type.

The nanocomposite compositions of this invention are resistant to swelling and degradation by organic solvents. Pristine cured polymers and conventional composite are readily swollen upon submersion in organic aromatic and aliphatic solvents, like toluene and hexane. Upon evaporation of the solvent the polymer matrix often disintegrates and forms cracks and crevices that greatly weaken the material. However, the cured polymer nanolayer hybrid composites of the present invention typically resist swelling by organic solvents and are restored to their original form upon the evaporation of solvents.

Epoxy Resins

Epoxy resins are especially suitable for illustrating the general teachings and versatility of this invention in providing for useful hybrid nanocomposite compositions and merit special description as provided below.

The epoxy resins are well known to those skilled in the art and are described in Kirk-Othmer, John Wiley & Sons, 9 267–290 (1980). They are available from a variety of commercial sources including Shell Co., Ciba, and The Dow Chemical.

Bisphenol A type EPON-828 (Shell Co., Houston, Tex.), is an epoxy resin precursor with the bisphenol A structure and a molecular weight of 380, and has the formula:

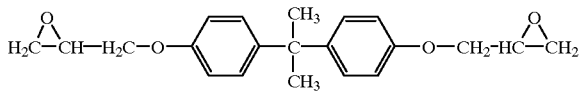

Bisphenol-A type, DER 331 (Dow Chemical Co., Midland, Mich.), is an epoxy polymer precursor and is an analog to Epon-828 having the formula:

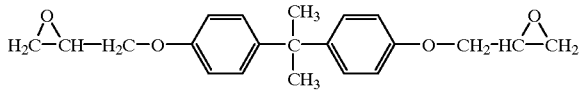

Bisphenol-F type, DER 354 (Dow Chemical Co.) is an epoxy polymer precursor having the formula:

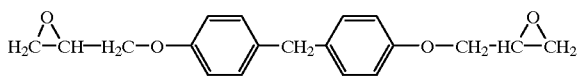

Novolac type, DER 435, DER 438 and DER 439 (Dow Chemical Co.) are epoxy polymer precursors having the formula:

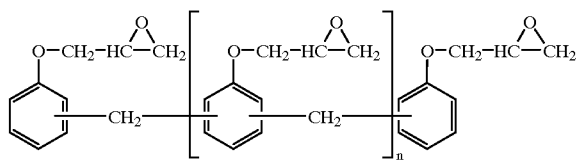

wherein n is between about 0.2 and 1.8.

Epoxy polymer, DER 732 (Dow Chemical Co.) is an epoxy resin precursor of the general formula:

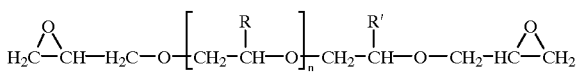

Epoxypropoxypropyl terminated polydimethylsiloxanes:

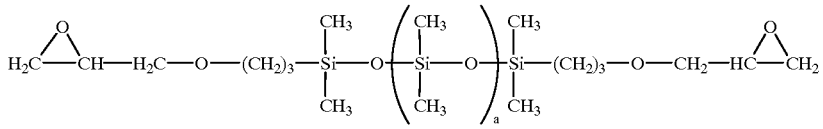

There are numerous other types of epoxy polymer precursors which are suitable and which are well known to those skilled in the art.

Epoxy Curing Agents

Amine curing agents are used to cure the epoxy resin precursors into an epoxy resin. The most preferred curing agents are polyoxypropylene di- or triamines which are sold as JEFFAMINE, Huntsman Chemical Company, Austin, Tex. Most preferred are the polyoxypropylene diamines (D-series) of the formula:

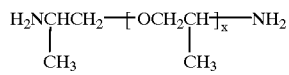

wherein x is between about 4 and 40.

The preferred diamines when used as curing agents for the epoxy resin precursors produce a glass transition temperature of less than ambient temperatures (25° C.) and preferably less than 0° C. As a result, when cured to a pristine epoxy resin without any filler, the resins are flexible when x is between about 4 and 40 in the polyoxypropylene diamine, the cured epoxy resin is also elastic.

The T series JEFFAMINE can be used. These are

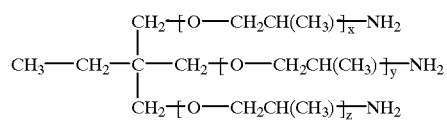

wherein x+y+z between about 4 and 120.

Various other epoxy resin curing agents, such as anhydrides and amides, can be used, so long as they do not interfere with the curing action of the primary ammonium cations in the clay. The amide curing agents are for instance

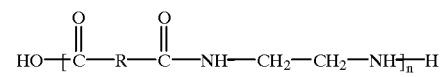

where n is between about 5 and 15.

Aminopropyl terminated polydimethylsiloxanes are suitable to crosslink epoxypropoxypropyl terminated polydimethylsiloxanes to make silicone rubber.

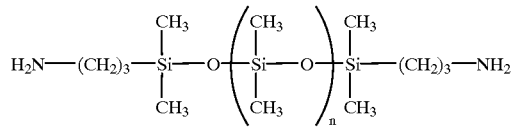

The final composite may be prepared from a single curing agent composition or from a multiple curing agent composition. The concentrate contains polymer precursors that are same as or different from those cured for preparing the final nanocomposite compositions.

When the polymer matrices in the hybrid nanocomposites of the present invention are flexible, they are very strong in comparison to the pristine polymer. The flexible composites of the present invention are particularly useful as sealants and flexible adhesives. They are strong, exhibiting a relatively high tensile strength. The compositions of the present invention can be used for: surface coatings, particularly decorative coatings; protective coatings; casting and encapsulation; construction, particularly seamless floors, sand-filled flooring, decorative aggregate, polymer concrete, trowel coatings, and wood consolidation; reinforced composites, particularly for propeller and impeller blades, boats, filament-wound tanks and piping; and adhesives. Other uses where a relatively thin flexible layer is needed are for instance in the dampening of interfaces between vibrating surfaces.

The polymer polymerizing component-layered ion exchange concentrate compositions described in this invention can be processed by already developed composite fabrication techniques, including casting and injection methods. For slow curing thermoset systems, e.g., epoxy and polysiloxane, several cast molding methods are very convenient; and for fast curing thermoset systems, e.g., alkyd and polyurethane, injection transferring method are suitable. The hybrid nanocomposites described in this invention not only can be used as end-use materials, but also, can be used as polymer matrix for fiber-reinforced composite materials. Further introduction of various fibers to the silicate nanolayer-reinforced polymer matrices will provide multicomponent composite materials.

The following are non-limiting examples of the present invention.

EXAMPLES

Example 1, 2

Example 1 demonstrates a new method for preparing the homostructured mixed onium ion-proton exchanged smectite clay by the acid-base reaction using a proton exchanged form clay and a neutral amine.

A 300 mL of aqueous suspension containing 3.0 g of H-montmorillonite (SWy-2, cation exchanged capacity (CEC)=90 meq./100 g) was preheated to 80° C. and combined with another 100 mL of aqueous suspension containing 0.40 g (1.50 mmo) of octadecylamine (C18A) which also had been preheated to 80° C. The proton form clay was obtained from its sodium form clay by reaction using an ion exchange resin. The suspension was blended using a household blender for 10 minutes. The product mixture was filtrated and air-dried. The air-dried product was converted to a powdered-form by blending using a commercial blender and an aggregated particle size smaller than 140 mesh (106 $\mu$m) was collected and oven-dried at 100° C. for 24 hours under $N_2$ flow. The homostructured mixed onium ion and proton clay has a basal spacing of 17.3 Å (E1, FIG. 4B) comparing to a 17.9 Å for a fully octadecylammonium exchanged organoclay (FIG. 4A). The ratio of onium ions to protons is near 55:45 for the final product.

Homostructured sample #2 was prepared by using reaction conditions analogous to E1 except that the amount of C18A amine in the acid-base reaction corresponded to 33% of the CEC value of the clay. E2 exhibited a basal spacing of 13.7 Å (FIG. 4C) relative to a 17.9 Å for a fully octadecylammonium exchanged organoclay. The ratio of onium ions to protons is near 33:67.

Examples 3–5

Examples 3–5 demonstrate the preparation of homostructured mixed onium ion-proton exchanged clays using an industrial, purified, medium charge density smectite clay (Belle Yellow, Sodium form clay from Nanocor, Inc., CEC= 130 meq./100 g).

A 400 mL of aqueous suspension containing 4.0 g of $H^+$-Belle Yellow was preheated to 80° C. and combined with another 200 mL of aqueous suspension containing 0.701 g (2.60 mmo) of octadecylamine which also had been preheated to 80° C. The proton form clay was obtained from sodium form clay by reaction using an ion exchange resin. The suspension was blended using a household blender for 10 minutes. The product mixture was filtrated and air-dried. The air-dried product was converted to a powdered-form by blending using a commercial blender and an aggregated particle size smaller than 140 mesh (106 $\mu$m) was collected and oven-dried at 100° C. for 24 hours under $N_2$ flow. E3 exhibits a basal spacing of 16.5 Å comparing to a 20.2 Å for a fully octadecylammonium exchanged CWC organoclay. The ratio of onium ions to protons is near 50:50.

Homostructured samples E4 and E5 were prepared by using reaction conditions analogous to E3 except that the amount of C18A amine in the acid-base reaction corresponded to 30% and 70% of the CEC value of the clay, respectively. E4 and E5 exhibited basal spacings of 13.9 Å and 17.9 Å respectively, relative to a 20.2 Å for a fully octadecylammonium exchanged organoclay.

Examples 6,7

Example 6 demonstrates the preparation of a homostructured mixed onium ion-proton exchanged clay using an industrial, purified, high charge density smectite clay (CWC, Sodium form clay from Nanocor, Inc., CEC=140 meq./100 g).

A 400 mL of aqueous suspension containing 4.0 g of $H^+$-CWC was preheated to 80° C. and combined with another 200 mL of aqueous suspension containing 0.755 g (2.80 mmo) of octadecylamine which also had been preheated to 80° C. The proton form clay was obtained from sodium form clay by reaction using an ion exchange resin. The suspension was blended using a household blender for 10 minutes. The product mixture was filtrated and air-dried. The air-dried product was converted to a powdered-form by blending using a commercial blender and an aggregated particle size smaller than 140 mesh (106$\mu$m) was collected and oven-dried at 100° C. for 24 hours under $N_2$ flow. The homostructured mixed onium ion and proton clay (E6) has a basal spacing of 17.6 Å comparing to a 21.7 Å for a fully octadecylammonium exchanged CWC organoclay. The ratio of onium ions to protons is near 50:50.

Example 7 demonstrates the preparation of a homostructured mixed onium ion-proton exchanged clay using another industrial purified, high charge density smectite clay, named VIC, from Nanocor, Inc. with a CEC value of 140. Homostructured sample E7 was prepared by using reaction conditions analogous to E6 with the amount of C18A amine corresponded to 50% of the CEC of the clay. E7 exhibited a similar basal spacing as E6, the fully octadecylammonium exchanged VIC organoclay also has a basal spacing of 217 Å.

Examples 8–10

Examples 8–10 demonstrate the preparation of homostructured mixed onium ion-proton exchanged clay wherein the proton clay was achieved by direct proton exchange reaction of sodium form clay with a Brönsted acid.

A 45.0 g of CWC montmorillonite (Nanocor, Inc.) in original cation exchange form (CEC=140 meq./100) was dispersed in 1500 mL of $H_2O$ and heated to about 80° C. This clay suspension was treated with 235 mL of 0.295 N HCL (69.3 mmo) by blending for 3–10 minutes using a commercial blender. A viscous $H^+$ clay slurry was formed and combined with 200 mL of an aqueous suspension containing 8.50 g of octadecylamine (31.5 mmo) which also had been preheated to 80° C. The mixture was blended at 75–100° C. for additional 3–10 minutes. The viscosity of the system dropped dramatically. The suspension containing the homostructured mixed onium ion and proton exchanged CWC clay was filtrated and washed with 1000 mL of deionized water. The clay filter cake was blended with an equal volume of water to form a slurry and air-dried. The air-dried product was converted to a powdered-form by blending using a commercial blender and an aggregated particle size smaller than 140 mesh (106 µm) was collected and oven-dried at 100° C. for 24 hours under $N_2$ flow. The product (E8) has a basal spacing of 17.4 Å (FIG. 5C) comparing to a 21.7 Å (FIG. 5A) for a fully octadecylammonium exchanged CWC organoclay. The ratio of onium ions to protons is near 50:50 which is confirmed by TGA measurement (FIG. 3).

Figure 6:
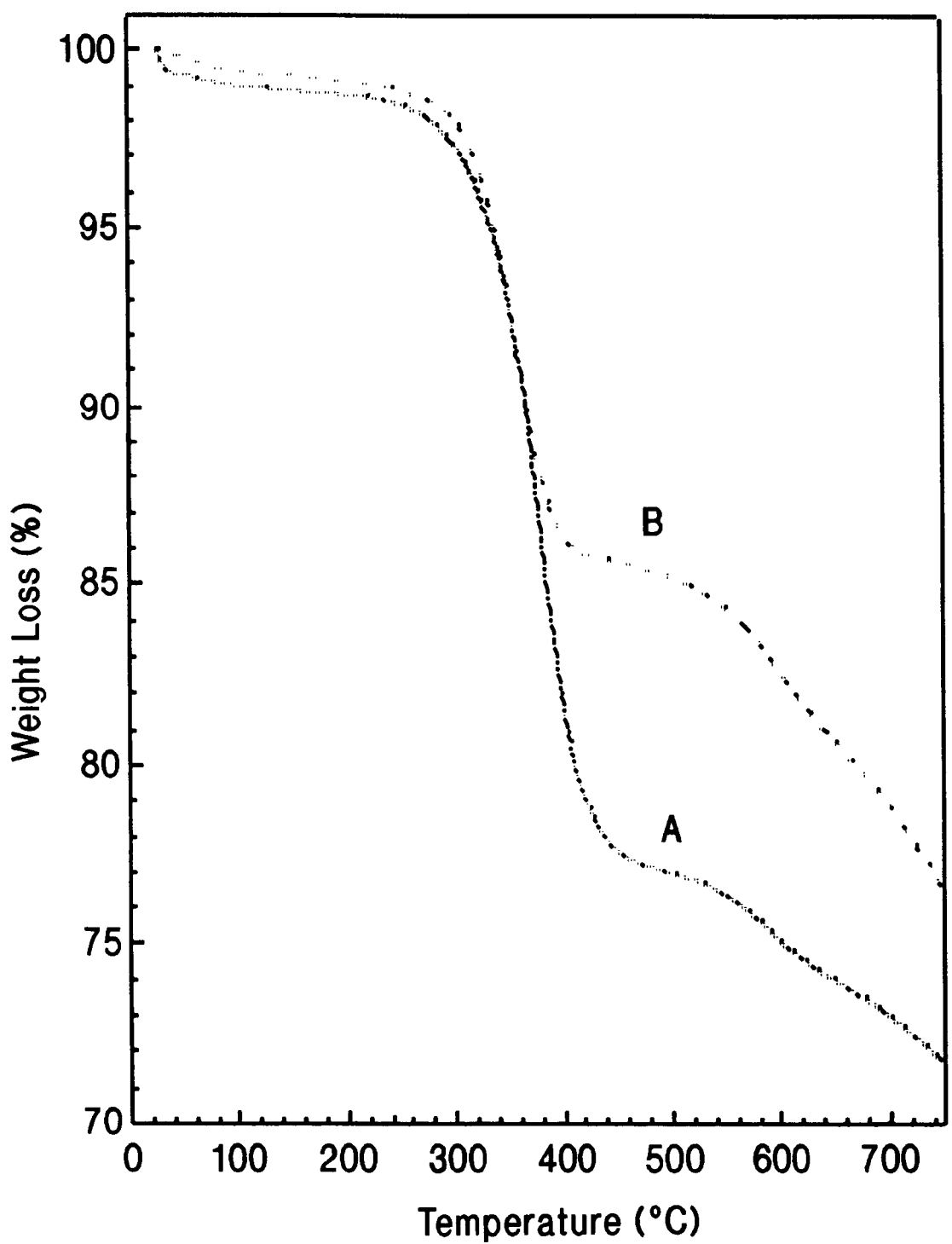
FIG. 6 is a graph showing TGA curves for (A) fully octadecylammonium exchanged CWC montmorillonite and (B) homostructured mixed octadecylammonium ion and proton CWC clay structures with the compositions of onium ions to protons near 65:35.

Homostructured samples E9 and E10 were prepared by using reaction conditions analogous to E8 except that the amount of C18 A amine in the acid-base reaction corresponded to 35% and 65% of the CEC value of the CWC clay, respectively. E9 and E10 exhibited basal spacings of 14.2 Å and 18.1 Å (FIGS. 5D and 5B), respectively, relative to a 21.7 Å for a fully octadecylammonium exchanged CWC organoclay. FIG. 6 showed TGA curves for sample E10 and the fully onium ion exchanged CWC organoclay.

Example 11

Example 11 demonstrates another method of preparing the homostructured mixed onium ion-proton exchanged clay by reacting the layered silicate in original cation exchange form with a solution containing both onium ions and protons to provide the usual molar ratio of protons to onium ions.

A 9.00 g of CWC montmorillonite (Nanocor, Inc.) In original cation exchange form (CEC=140 meq./100 g) was dispersed in 300 mL of $H_2O$ and heated to about 80° C. This clay suspension was combined with 300 mL of solution containing 1.70 g of octadecylamine (6.3 mmol) and 13.9 mmol of HCl which was preheated to 80° C. The mixture of these two suspensions was blended at 75–100° C. for 3–10 minutes. The suspension containing the homostructured mixed octadecylammonium ion and proton exchanged CWC was filtrated and washed with additional 400 mL of deionized water. The clay filter cake was blended with an equal volume of water to form a slurry and air-dried. The air-dried product was converted to a powdered-form by blending and an aggregated particle size smaller than 140 mesh (106 µm) was collected and oven-dried at 100° C. for 24 hours under $N_2$ flow. The final product (E11) has a basal spacing of 17.7 Å comparing to a 21.7 Å for a fully octadecylammonium exchanged CWC organoclay. The ratio of onium ions to protons is near 50:50.

Example 12

Example 12 illustrates the formation of homostructured organic-inorganic ion exchanged clay wherein the onium ion precursor is the molecule containing tertiary amine group.

Figure 7:
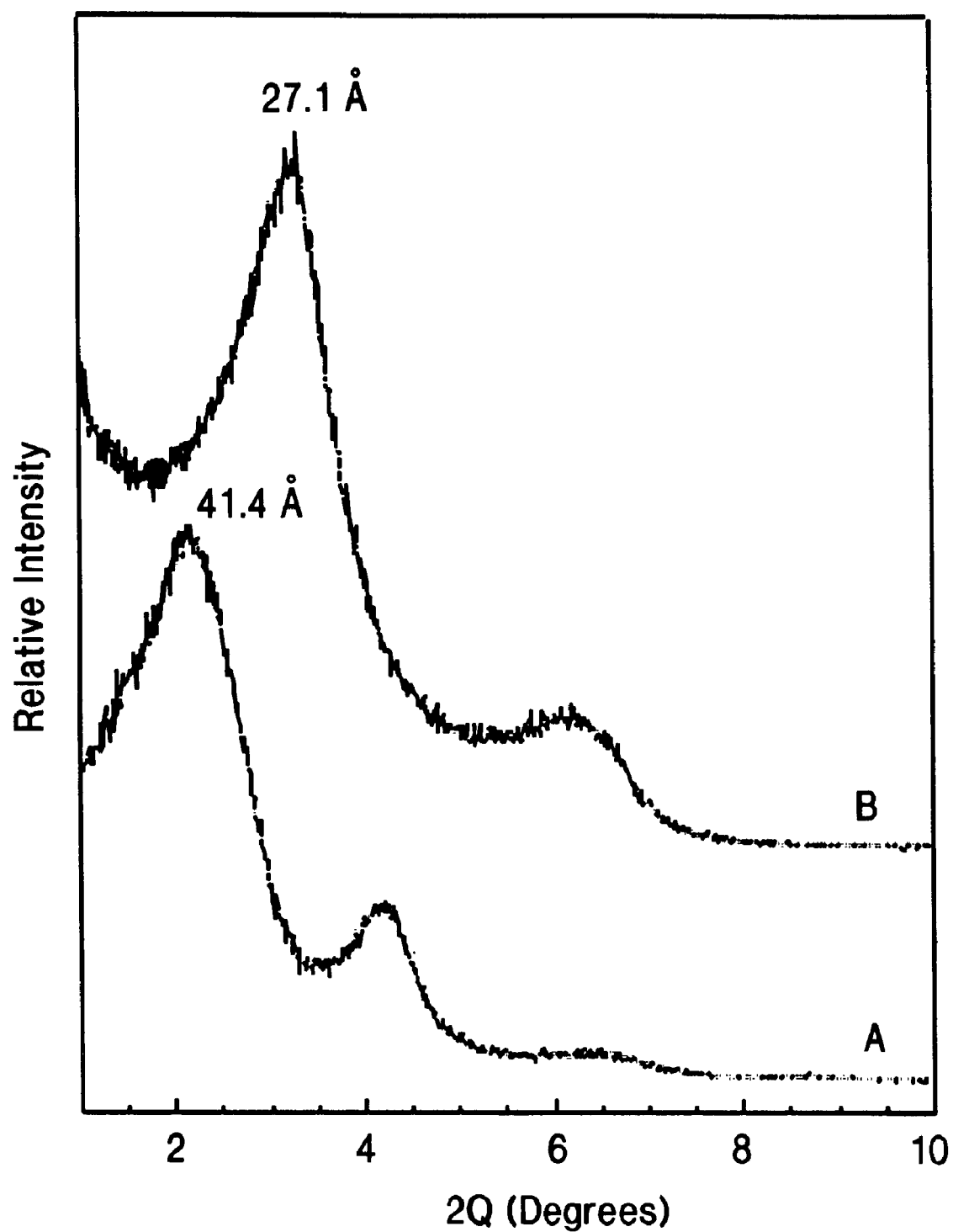
FIG. 7 is a graph showing XRD patterns of (A) the fully bis(2-hydroxyethyl) octadecyloxypropylammonium exchanged CWC organoclay and (B) its homostructured clay with the composition of onium ions to protons near 50:50.

A 600 mL of aqueous suspension containing 6.0 g of $H^+$-CWC was preheated to 80° C. and combined with another 200 mL of aqueous suspension containing 1.89 g of bis(2-hydroxyethyl) octadecyloxypropylamine (4.20 mmo) from Toman Products, Inc. The proton form clay was obtained from sodium form CWC clay (CEC=14-0 meq./100 g) by reaction using an ion exchange resin. The suspension was blended using a household blender for 10 minutes. The product mixture was filtrated and air-dried. The air-dried product was converted to a powdered-form by blending using a commercial blender and an aggregated particle size smaller than 140 mesh (106 µm) was collected and oven-dried at 100° C. for 24 hours under $N_2$ flow. The homostructured mixed onium ion and proton clay (E12) has a basal spacing of 27.1 Å comparing to a 41.4 Å for the fully bis(2-hydroxyethyl)octadecyloxypropylammonium exchanged CWC organoclay (FIG. 7). The ratio of onium ions to protons is near 50:50.

Example 13

Example 13 illustrates the formation of homostructured organic-inorganic ion exchanged clay wherein the amine molecule is the precursor for a thermoplastic polymer.

Figure 8:
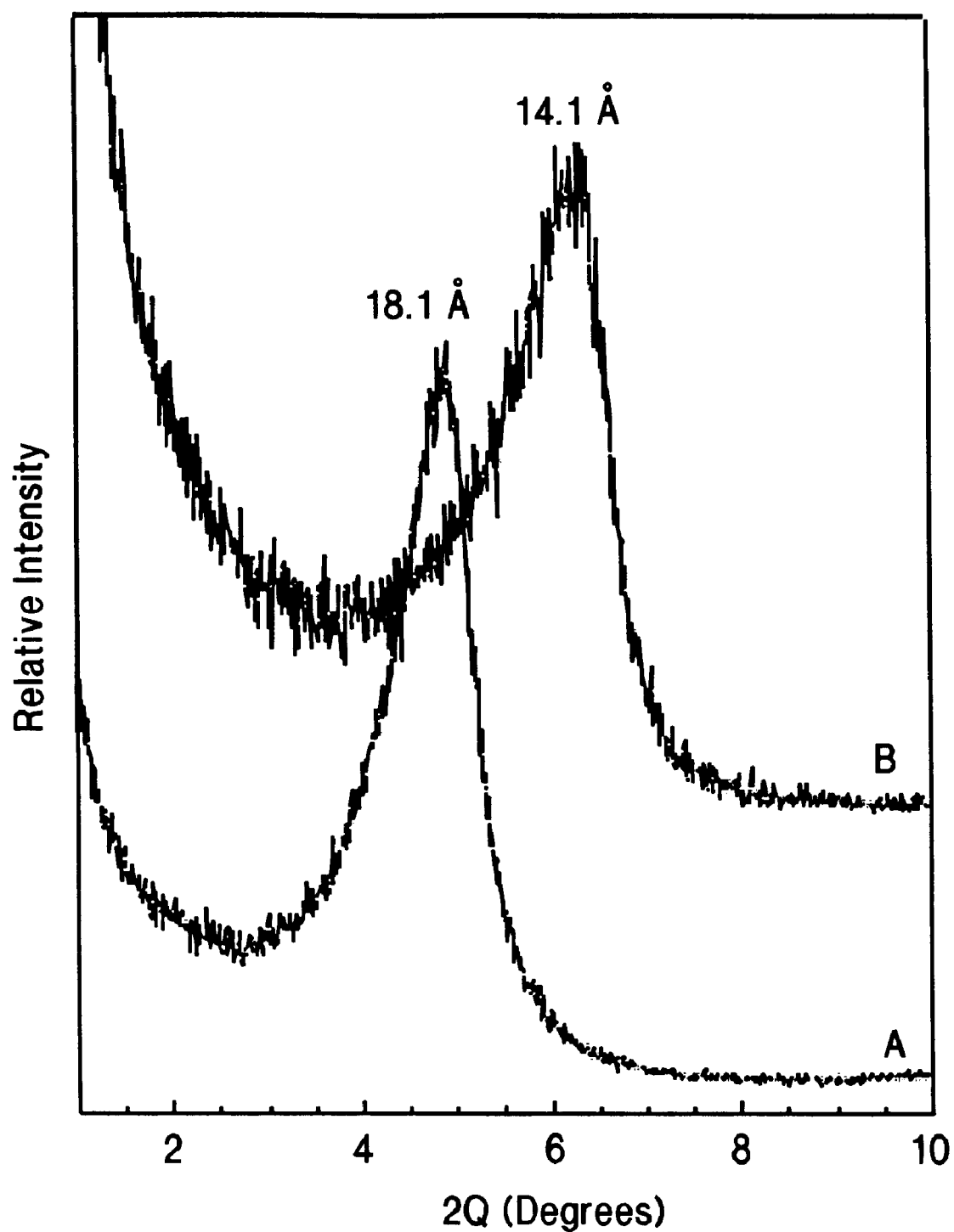
FIG. 8 is a graph showing XRD patterns of (A) the fully 12-ammonium dodecanoic acid exchanged CWC organoclay, and (B) its homostructured clay with the composition of onium ions to protons near 65:35.

A 18.0 g of CWC montmorillonite (Nanocor, Inc.) in original cation exchange form (CEC=140 meq./100 g) was dispersed in 600 mL of $H_2O$ and heated to about 80° C. This clay suspension was combined with 300 mL of solution containing 3.53 g of 12-aminododecanoic acid (16.4 mmo) and 37.8 mmo of HCl which was preheated to 80° C. The mixture of these two suspensions was blended for 10 minutes. The suspension containing the homostructured mixed onium and proton exchanged CWC was filtrated and washed with additional 1000 mL of deionized water. The air-dried product was converted to a powdered-form by blending and an aggregated particle size smaller 106 µm) was collected and oven-dried at 100° C. for 24 hours under $N_2$ flow. The final product (E13) has a basal spacing of 14.1 Å comparing to a 18.1 Å for the fully onium ion exchanged CWC organoclay (FIG. 8). The ratio of onium ions to protons is near 65:35.

Examples 14, 15

Examples 14 and 15 illustrate the potential application of homostructured organic-inorganic mixed ion clays as reagents for the formation of organic polymer-clay nanocomposites. The polymer matrices selected as examples were cross-linked thermoset polymer of thermoplastic polymer.

Figure 9:
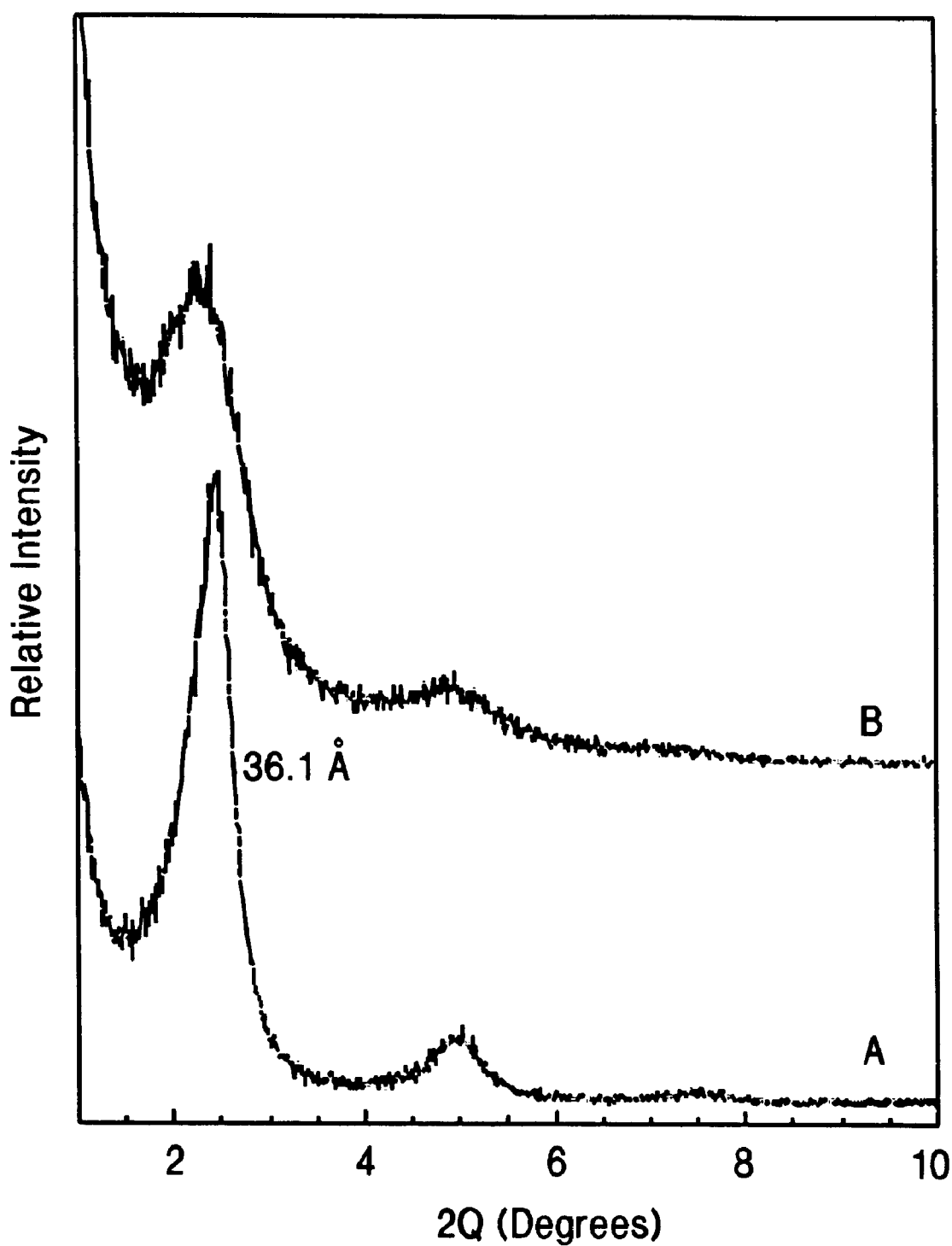
FIG. 9 is a graph showing XRD patterns for the solvated phases of (A) the fully octadecylammonium exchanged CWC montmorillonite, and (B) its homostructured clay with the composition of onium ions to protons near 65:35 by EPON828 at 50° C.

The swelling properties of the homostructured mixed octadecylammonium ion and proton exchanged CWC clay by a polymer precursor was demonstrated as the following. A 0.3 g of sample E10 was mixed with 1.7 g of EPON 828 from Shell by stirring with a magnetic stirrer for 30 minutes at temperature of 50° C. The solvated phase of E10 is shown in FIG. 9 as compared with the result for a fully exchanged CWC organoclay. The gallery expansion for both samples is very similar. An epoxy-clay nanocomposite can be formed after a desired amount of curing agent is added to the above epoxide and clay mixture, followed by subsequent curing reaction.

Figure 10:
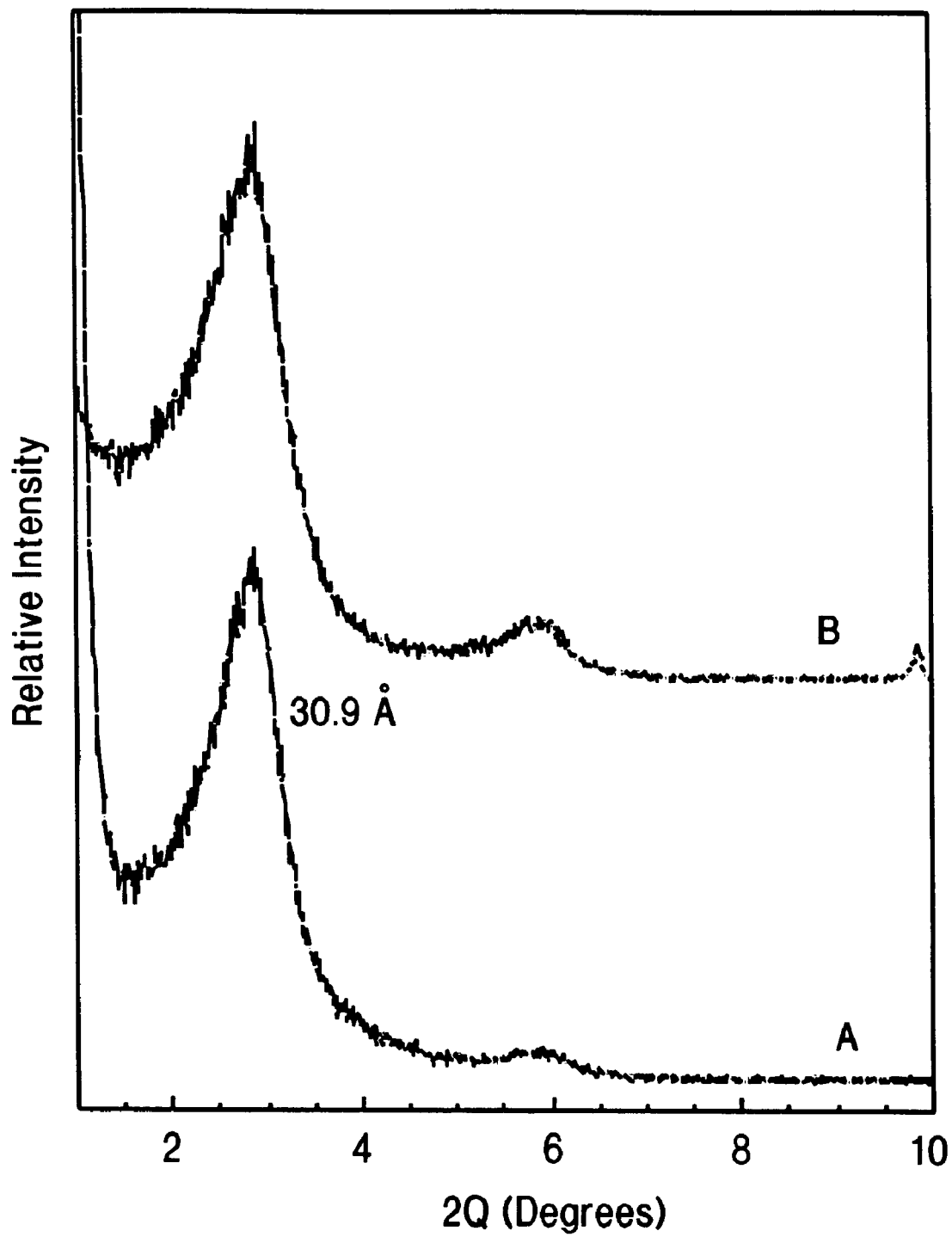
FIG. 10 is a graph showing XRD patterns for the solvated phases of (A) the fully octadecylammonium exchanged CWC montmorillonite, and (B) its homostructured clay with the composition of onium ions to protons near 65:35 by $\epsilon$-caprolactam at 100° C.

The organophilic and swelling properties for the homostructured mixed octadecylammonium ion and proton exchanged CWC clay was further demonstrated by another example when the homostructured CWC clay was mixed with melt ε-caprolactam from Aldrich by stirring at temperature of 100° C. The gallery expansion for the homostructured mixed octadecylammonium ion and proton exchanged CWC is very similar as the fully exchanged CWC organoclay which is shown in FIG. 10. The nylon 6-clay nanocomposite can be formed by further polymerization reaction.

We conclude, therefore, the intercalation properties of homostructured mixed ion clays are very similar to fully exchanged homoionic organoclays. The homostructured mixed ion clays can replace the homoionic organoclays which consume more expensive surfactants and can be widely used in many applications.

It is intended that the foregoing description be only illustrative of the present invention and that the present invention be limited only by the hereinafter appended claims.

We claim:

1. A process for the preparation of homostructured mixed organic and inorganic cation exchanged layered silicate with galleries between the layers, wherein the galleries between the silicate nanolayers of the said homostructure are co-occupied by protons and onium ions in a molar ratio of protons to onium between about 10 to 90 and 90 to 10, which comprises the steps of:

(a) providing an inorganic layered silicate in proton exchanged form; and (b) intercalating an organic onium ion precursor in a solvent into the layered silicate which reacts with the protons in the galleries to form the organic and inorganic cation exchanged layered silicate containing the onium ions and the protons.

2. The process of claim 1 wherein the proton exchanged form of the inorganic layered silicate in step (a) is obtained by thermal conversion from an ammonium exchanged form of the layered silicate.

3. The process of claim 1 wherein the proton exchanged form in step (a) is provided by ion exchange of an inorganic metal cation exchange form of the silicate with the proton form of an ion exchange resin.

4. The process of claim 1 wherein the proton exchanged form in step (a) is provided by direct proton exchange with a Brönsted acid.

5. The process of any one of claims 1, 2, 3 or 4 wherein the inorganic layered silicate is selected from the group consisting of a smectite clay, a synthetic smectite derivative; a mixed layered clay, a synthetic mixed layered clay, vermiculite, a mica, a hydromica; and a synthetic mica derivative.

6. The process of any one of claims 1, 2, 3 or 4 wherein the onium ion precursor is selected from the group consisting of primary, secondary, tertiary amines and mixtures thereof.

7. A process for the preparation of homostructured mixed organic and inorganic cation exchanged layered silicate with galleries between the layers, wherein the galleries between the silicate nanolayers of the said homostructure are co-occupied by protons and onium ions in a molar ratio of protons to onium between about 10 to 90 and 90 to 10, which comprises the steps of:

(a) providing an inorganic layered silicate; and (b) co-intercalating in a solvent an organic onium ion and protons into the layered silicate to form the homostructured mixed organic and inorganic cation exchanged layered silicate.

8. The process of claim 7 wherein the proton exchanged form of the inorganic layered silicate in step (a) is obtained by thermal conversion from an ammonium exchanged form of the layered silicate.

9. The process of claim 7 wherein the proton exchanged form in step (a) is provided by ion exchange of an inorganic metal cation exchange form of the silicate with the proton form of an ion exchange resin.

10. The process of claim 7 wherein the proton exchanged form in step (a) is provided by direct proton exchange with a Brönsted acid.

11. The process of any one of claims 7, 8, 9 or 10 wherein the inorganic layered silicate is selected from the group consisting of a smectite clay, a synthetic smectite derivative; a mixed layered clay, a synthetic mixed layered clay, vermiculite, a mica, a hydromica; and a synthetic mica derivative.

12. The process of any one of claims 7, 8, 9 or 10 wherein the onium ion is selected from the group consisting of primary, secondary, tertiary amines and mixtures thereof reacted with an excess of acid which produces the protons.

* * * * *

UNITED STATES PATENT AND TRADEMARK OFFICE
CERTIFICATE OF CORRECTION

PATENT NO. : 6,261,640 B1
DATED : July 17, 2001
INVENTOR(S) : Thomas J. Pinnavaia and Zhen Wang It is certified that error appears in the above-identified patent and that said Letters Patent is hereby corrected as shown below:

Column 1, Table 1,
Line 65, "$H_2O[Mg_{4.0}]$" should be -- $H_2O[Mg_{6.0}]$ --.

Column 2, Table 1,
Line 17, "y 21 2)" should be -- y < 2) --.

Column 2, Table 2,
Line 57, "$H_2\{M^{IV}(AS_4)_2\}$" should be -- $H_2\{M^{IV}(As_4)_2\}$ --.

Column 4,
Line 29, "Theological control" should be -- Rheological control --.

Column 5,
Line 20, "Na+-montmorillonaite" should be -- Na+-montmorillonite --.

Column 6,
Line 22, "Na ions" should be -- Na+ ions --.
Line 51, "by Xu ad" should be -- by Xu and --.

Column 7,
Line 20, "Theological" should be -- rheological --.

Column 12,
Line 48, "200;1 and 1:100," should be -- 200:1 and 1:100, --.
Line 61, "in -a mole ratio" should be -- in a mole ratio --.

Column 13,
Line 15, "of te galleries" should be -- of the galleries --.

Column 15,
Line 35, "$O^+/I^+$-cay" should be -- $O^+/I^+$-clay --.

Column 17,
Line 32, "Theological" should be -- rheological --.

UNITED STATES PATENT AND TRADEMARK OFFICE
CERTIFICATE OF CORRECTION

PATENT NO. : 6,261,640 B1
DATED : July 17, 2001
INVENTOR(S) : Thomas J. Pinnavaia and Zhen Wang It is certified that error appears in the above-identified patent and that said Letters Patent is hereby corrected as shown below:

Column 21,
Line 49, "$H_2O$ ethanol" should be -- $H_2O$/ethanol --.

Signed and Sealed this

Twelfth Day of March, 2002

JAMES E. ROGAN
*Director of the United States Patent and Trademark Office*

Attest:

*Attesting Officer*